US009913100B2

(12) United States Patent
Agarwal et al.

(10) Patent No.: US 9,913,100 B2
(45) Date of Patent: Mar. 6, 2018

(54) TECHNIQUES FOR GENERATING MAPS OF VENUES INCLUDING BUILDINGS AND FLOORS

(71) Applicant: Apple Inc., Cupertino, CA (US)

(72) Inventors: Ashish Agarwal, Sunnyvale, CA (US); Ian Aric Mondragon, Cupertino, CA (US); Rahul Ravikumar, San Jose, CA (US); Calvin Lin, San Francisco, CA (US); Max Muller, III, San Jose, CA (US); Philip Stanger, Cupertino, CA (US); Vojislav Samsalovic, Saratoga, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 14/503,109

(22) Filed: Sep. 30, 2014

(65) Prior Publication Data

US 2015/0350844 A1    Dec. 3, 2015

Related U.S. Application Data

(60) Provisional application No. 62/006,012, filed on May 30, 2014.

(51) Int. Cl.
*H04W 4/02* (2009.01)
*H04W 4/04* (2009.01)
*G01C 21/20* (2006.01)

(52) U.S. Cl.
CPC .......... *H04W 4/028* (2013.01); *G01C 21/206* (2013.01); *H04W 4/043* (2013.01)

(58) Field of Classification Search
CPC ..... H04W 4/028; H04W 4/043; G01C 21/206

USPC .................................................... 455/456.2
See application file for complete search history.

(56) References Cited

U.S. PATENT DOCUMENTS

| | | | |
|---|---|---|---|
| 7,313,402 B1 * | 12/2007 | Rahman | H04W 24/06 455/456.1 |
| 7,397,424 B2 | 7/2008 | Houri | |
| 7,856,234 B2 | 12/2010 | Alizadeh-Shabdiz et al. | |
| 7,899,583 B2 | 3/2011 | Mendelson | |
| 7,924,149 B2 | 4/2011 | Mendelson | |
| 8,054,219 B2 | 11/2011 | Alizadeh-Shabdiz | |
| 8,223,074 B2 | 7/2012 | Alizadeh-Shabdiz | |
| 8,369,264 B2 | 2/2013 | Brachet et al. | |
| 8,386,422 B1 | 2/2013 | Kadous | |
| 8,478,297 B2 | 7/2013 | Morgan et al. | |

(Continued)

*Primary Examiner* — Nathan Mitchell
(74) *Attorney, Agent, or Firm* — Fish & Richardson P.C.

(57) ABSTRACT

Techniques for storing information representing a venue are described. A venue data provider may upload venue data to a venue data service. The venue data can include locations, geometries, and business categories of the buildings and floors. The venue data service can validate the venue data, and request a survey service to survey the venue using the validated venue data. A survey can include recording measurements of an environment variable at various locations of the venue. The location service can generate location fingerprint data from the survey. The location fingerprint data can include expected measurements of the environment variable at various locations of the building. The venue data service can provide the location fingerprint data to a mobile device such that the mobile device can determine a location of the mobile device in the venue using sensor readings of the environment variable.

21 Claims, 12 Drawing Sheets

(56) References Cited

U.S. PATENT DOCUMENTS

| | | | |
|---|---|---|---|
| 8,818,324 B1* | 8/2014 | Hines, III | G01S 5/0205 455/404.1 |
| 8,836,580 B2 | 9/2014 | Mendelson | |
| 8,866,673 B2 | 10/2014 | Mendelson | |
| 8,896,485 B2 | 11/2014 | Mendelson | |
| 8,941,485 B1 | 1/2015 | Mendelson | |
| 8,983,493 B2 | 3/2015 | Brachet et al. | |
| 9,020,687 B2 | 4/2015 | Mendelson | |
| 9,204,251 B1 | 12/2015 | Mendelson | |
| 9,204,257 B1 | 12/2015 | Mendelson | |
| 2005/0071350 A1 | 3/2005 | Artale | |
| 2011/0018732 A1* | 1/2011 | Cho | G01S 5/0236 340/8.1 |
| 2012/0021771 A1* | 1/2012 | Gupta | G01C 21/20 455/456.3 |
| 2012/0029817 A1* | 2/2012 | Khorashadi | G01C 21/20 701/451 |
| 2012/0064855 A1 | 3/2012 | Mendelson | |
| 2012/0066035 A1* | 3/2012 | Stanger | G06Q 30/0207 705/14.1 |
| 2012/0143878 A1 | 6/2012 | Fendley et al. | |
| 2013/0225202 A1* | 8/2013 | Shim | G06F 17/30424 455/456.3 |
| 2014/0036099 A1 | 2/2014 | Balassanian et al. | |
| 2014/0073345 A1* | 3/2014 | Chintalapudi | G01C 21/165 455/456.1 |
| 2014/0348013 A1* | 11/2014 | Terrenoir | G01S 5/0252 370/252 |
| 2014/0365119 A1 | 12/2014 | Haverinen et al. | |
| 2015/0126215 A1* | 5/2015 | Pandey | G01S 5/021 455/456.1 |
| 2015/0141056 A1* | 5/2015 | Fefilatyev | H04W 4/021 455/456.3 |
| 2015/0172864 A1 | 6/2015 | Fabrikant et al. | |
| 2015/0350830 A1* | 12/2015 | Lin | H04W 4/021 455/456.1 |
| 2016/0034515 A1 | 2/2016 | Katragadda et al. | |
| 2016/0094951 A1* | 3/2016 | Yang | H04W 4/028 455/456.1 |
| 2016/0094954 A1* | 3/2016 | Millman | H04W 4/046 455/456.2 |
| 2016/0357768 A1 | 12/2016 | Strong et al. | |

* cited by examiner

TECHNIQUES FOR GENERATING MAPS OF VENUES INCLUDING BUILDINGS AND FLOORS

CROSS-REFERENCE TO RELATED APPLICATION

This application claims priority to U.S. Provisional Patent Application No. 62/006,012, entitled "Venue Data Framework," filed May 30, 2014, the entire contents of which is incorporated herein by reference.

TECHNICAL FIELD

This disclosure relates generally to location-based services.

BACKGROUND

Some mobile devices have features for determining a geographic location. For example, a mobile device can include a receiver for receiving signals from a global satellite system (e.g., global positioning system or GPS). The mobile device can determine a geographic location, including latitude and longitude, using the received GPS signals. The mobile device can then display the geographic location on a virtual map on a display screen. The virtual map can be stored in various data formats. The mobile device may visit a venue that includes indoor space. Maps of indoor space may not be easily available. Even when the maps are available, the maps may not be up to date due to frequent changes to the indoor space, e.g., when a store moves into or out of a mall, causing floor plan to be reconfigured. Even when the maps are up to date, indoor navigation may be difficult or unavailable due to lack of accurate GPS signals in the indoor space as well as lack of integration between maps of outdoor space and maps of indoor space.

SUMMARY

Techniques for generating maps of venues are described. A venue may include one or more buildings each of which includes one or more floors. A venue data provider, e.g., an owner of the venue, may register with a venue data service and upload venue data to the venue data service. The venue data can include locations, geometries, and business categories of the buildings and floors. The venue data service can validate the venue data, and request a survey service to survey the venue using the validated venue data. A survey can include recording measurements of an environment variable, e.g., strength of a wireless signal, at various locations of the venue. The location service can generate location fingerprint data from the survey. The location fingerprint data can include expected measurements of the environment variable at various locations of the building. The venue data service can provide the location fingerprint data to a mobile device such that the mobile device can determine a location of the mobile device in the venue using sensor readings of the environment variable.

Techniques for validating venue data are described. The venue data can include records describing physical features of a venue and records describing conceptual features of the venue. A validation engine can detect conflicts between records in the venue data or conflicts between records in the venue data and external data. The conflict can include a physical conflict between two physical features, e.g., when a floor of a building is larger than a footprint of the building, a conceptual conflict between two occupants of a venue, e.g., when an airport baggage claim area is located next to a high school, or a relationship conflict between an occupant and a venue in which the occupant is allegedly located, e.g., ski resort located in an office building. The conflict can be defined in conflict rules. The validation engine can learn the conflict rules from historical venue data and truth references.

Techniques for enriching venue data are described. The venue data can include records describing physical features of a venue and records describing conceptual features of the venue. A data enrichment engine can enrich the venue data using probe data by automatically correcting inconsistencies in the venue data or adding additional information to the venue data. The probe data can include crowd-sourced data from multiple mobile devices. The probe data can include motion sensor data, application launch data, and site survey data.

The features described in this specification can be implemented to achieve one or more advantages. Compared to conventional maps that display geographic features, the features described in this specification can provide maps with higher granularity, including, for example, information about which floor and which unit is occupied by what business. Accordingly, a mobile device displaying a map can provide an indoor location of an office in an office building, or an indoor location of a shop in a mall, and directions on how to reach that location from a starting indoor location.

Compared to conventional maps, the features described in this specification can be more flexible, in that these features allow an owner of a venue to provide maps of the venue and ways a mobile device determines a location in the venue. A venue owner can create maps online, and help generate location fingerprint data for the venue. Such flexibility can allow the venue owner to update the online map and location fingerprint data quickly when structure or tenants of the venue changes. The update can give mobile device users better experience when trying to navigate through the structure of the venue to reach a tenant. The venue owner can also be notified automatically by the system when it is time to update information about the venue. The system determines update time by collecting and processing changes in contextual information within or surrounding the venue, e.g. changes in service set identifiers (SSIDs), pedestrian traffic in new areas not covered by existing venue geometry, and other similar information.

The details of one or more implementations of the subject matter are set forth in the accompanying drawings and the description below. Other features, aspects, and advantages of the subject matter will become apparent from the description, the drawings, and the claims.

BRIEF DESCRIPTION OF THE DRAWINGS

Like reference symbols in the various drawings indicate like elements.

DETAILED DESCRIPTION

Exemplary Workflow

Figure 1:
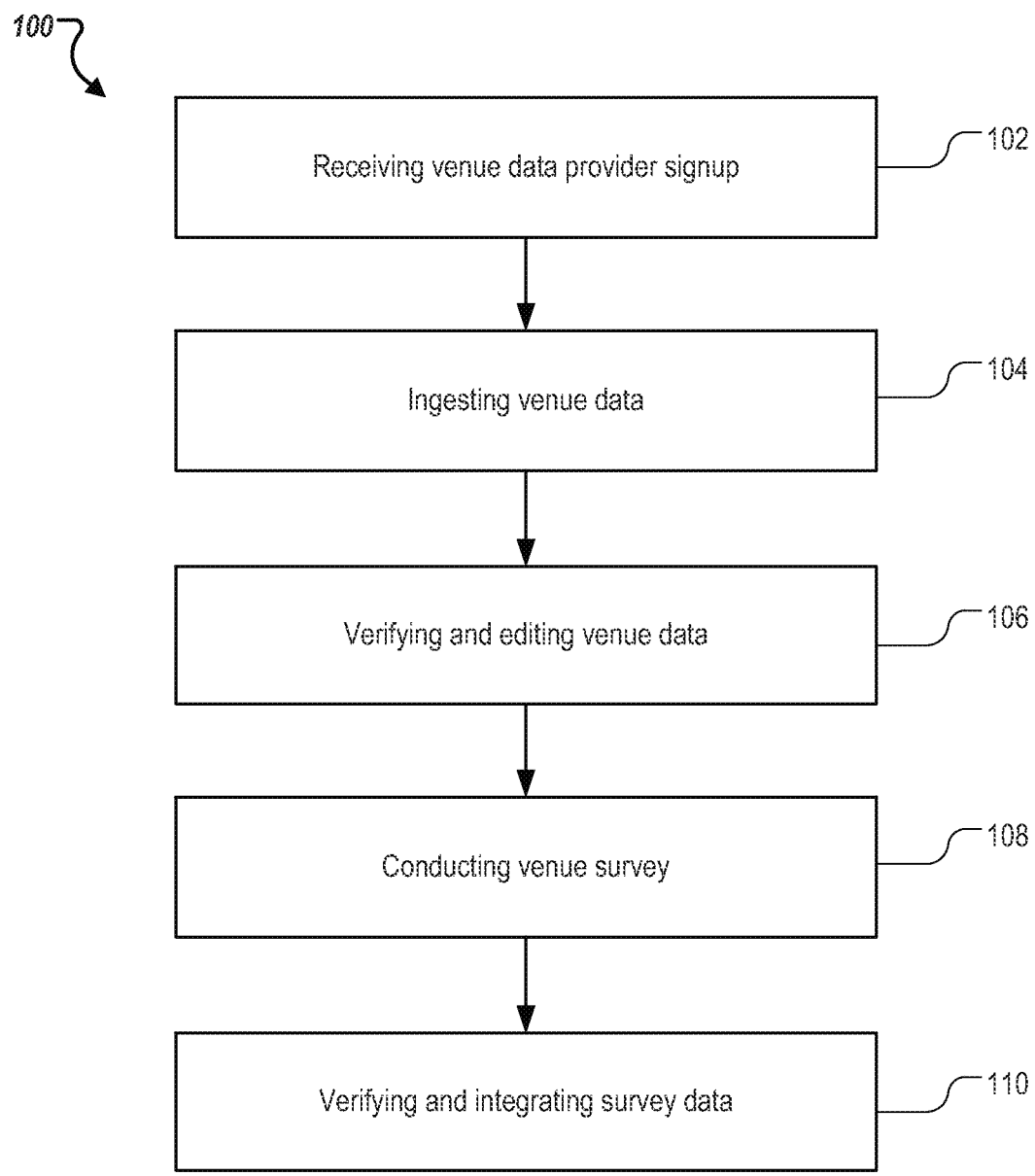
FIG. 1 is a flowchart illustrating an exemplary workflow of providing venue data services.

FIG. 1 is a flowchart illustrating an exemplary workflow of providing venue data services. A venue data service system can receive (102) a request to sign up for venue data service. The request can be submitted from a venue data provider, e.g., venue owner. A venue can be a space having one or more structures, e.g., buildings, that have finer structural granularity than available granularity of GPS or WiFi™ triangulation. The structures of a venue can include one or more constraints limiting a person's movement in the space. These constraints can include, for example, map constraints (e.g., walls, railings, or cubicle separators), pathway constraints (e.g., a pedestrian walking on a pathway defined by road signs tends to follow the pathway), or area constraints (e.g., a playground for children below age 12). A venue can include one or more physical features, e.g., buildings, levels of a building including underground levels, or units on a level. Each physical structure can be closed (e.g., an office building) or open (e.g., an open stadium). A venue can include one or more conceptual features. Each conceptual feature can be an entity, e.g., a retail merchant, occupying a portion of the venue, or a logical sub-section of one or more physical spaces within the venue, e.g. the infant's section of a children's clothing area on a single floor. A conceptual feature can occupy more than one physical structure of the venue. For example, a retail store may occupy multiple levels of a building. A physical structure can be occupied by multiple entities. For example, the ground floor of a shopping mall may be occupied by multiple retail merchants.

After the venue data provider signs up, the venue data service system can ingest (104) venue data. Ingesting venue data can include obtaining the venue data from one or more venue data provider computers through application programming interface (API) or web page based upload. The venue data can include records describing the physical features of the venue and records describing the conceptual features of the venue. The records describing the physical features can include records describing geographic attributes and other attributes of the venue, each building located at the venue, each level of each building, and each unit on each level. The geographic attributes can include points, lines, polylines, and polygons in two-dimensional (2D) or three-dimensional (3D) space. Geographic attributes representing 3D features can include feature altitude as absolute measure or feature height as relative measure in 3D space. A feature altitude can be measured relative to the ground level at the location where the venue is located, or as measured from above sea level. The other attributes can include a category of the venue, each building, each level, and each unit. The category can include a code, e.g., a Census Feature Class Code (CFCC) that represents a characteristic of the venue, building, level, or unit. In certain situations, feature categories can be automatically derived or corrected based on other attributes used to describe a feature, e.g. a linked menu or list of products sold can be used to assign restaurant or clothing store category for an occupant without a specific category assigned to the occupant.

The records describing the conceptual features can include records describing geographic attributes and other attributes of a point of interest (POI), an occupant, or a zone of interest. The geographic attributes can include a point location, line, polyline, or a polygon. The other attributes can include a category, name, description, contact information of the POI, occupant, or zone of interest. All attributes can be provided in one or more languages and locales. A default language and locale will be selected by the system automatically to present the most suitable attribute version on the device when a desired language and locale is not available.

The records can be stored as nested data objects in a venue file, where each data object corresponds to a record. A first data object is nested in a second data object by including an identifier of the second data object. The first data object is nested in the second data object when the record corresponding to the first data object represents a first feature that is located inside a second feature represented by a record corresponding to the second data object.

The venue data service system can validate and edit (106) the received venue data. Validating and editing the venue data can include determining if an attribute of a feature in the venue data conflicts with an attribute of another feature in the venue data, or if an attribute of a feature conflicts with external data, e.g., outdoor map data. The venue data service can also validate and correct attributes by comparing and corroborating attribute values from multiple data providers and public websites. Upon detecting a conflict, the venue data service system can perform various actions, including, for example, rejecting the venue data, requesting a venue data provider to correct the conflict, or revising the venue data with truth data pre-stored on the venue data service system. The truth data can include descriptions of features that have been confirmed to be true. In the data corroboration case, an attribute value from the most trusted data provider or the value the majority agrees on takes precedence.

A mobile device running a custom client application connected to the venue data service system can conduct (108) a venue survey. Conducting the venue survey can include using mobile device's sensors to obtain measurements of one or more environment variables, e.g., received signal strength indications (RSSIs) of wireless signals from various signal sources at the venue, iBeacons™ or other Bluetooth™ Low Energy (BLE) transmitters, air pressure sensors, cameras, accelerometers, gyroscopes, near-field communication (NFC) chips or LIDAR devices. The measurements can be associated with respective locations at which the measurements were taken. Conducting the survey can include providing venue information, including a venue map generated from the venue data, to one or more sampling devices to record the measurements. The venue data service system can then receive survey data from the one or more sampling devices, the survey data including the measurements.

The venue data service system can validate and integrate (110) the survey data and the venue data. Validating the survey data can include determining whether the survey data is consistent with physical structures and conceptual features of the venue. Integrating the survey data and the venue data can include generating location fingerprint data of the venue. The location fingerprint data can include expected measurements of the environment variables at various locations within the venue. The venue data service system can determine the expected measurements for locations in the venue that are not surveyed by interpolating and extrapolating based on the physical structure of the venue as described in the georeferenced venue data and signal propagation characteristics.

In addition, data integration can include integrating the venue data with other data, including, for example, outdoor map data, transit data, and flyover data. The venue data service system can provide the location fingerprint data and other integrated, data to a user device for determining the location of a user device inside the venue, even when GPS signals are unavailable or inaccurate within the venue.

Figure 2:
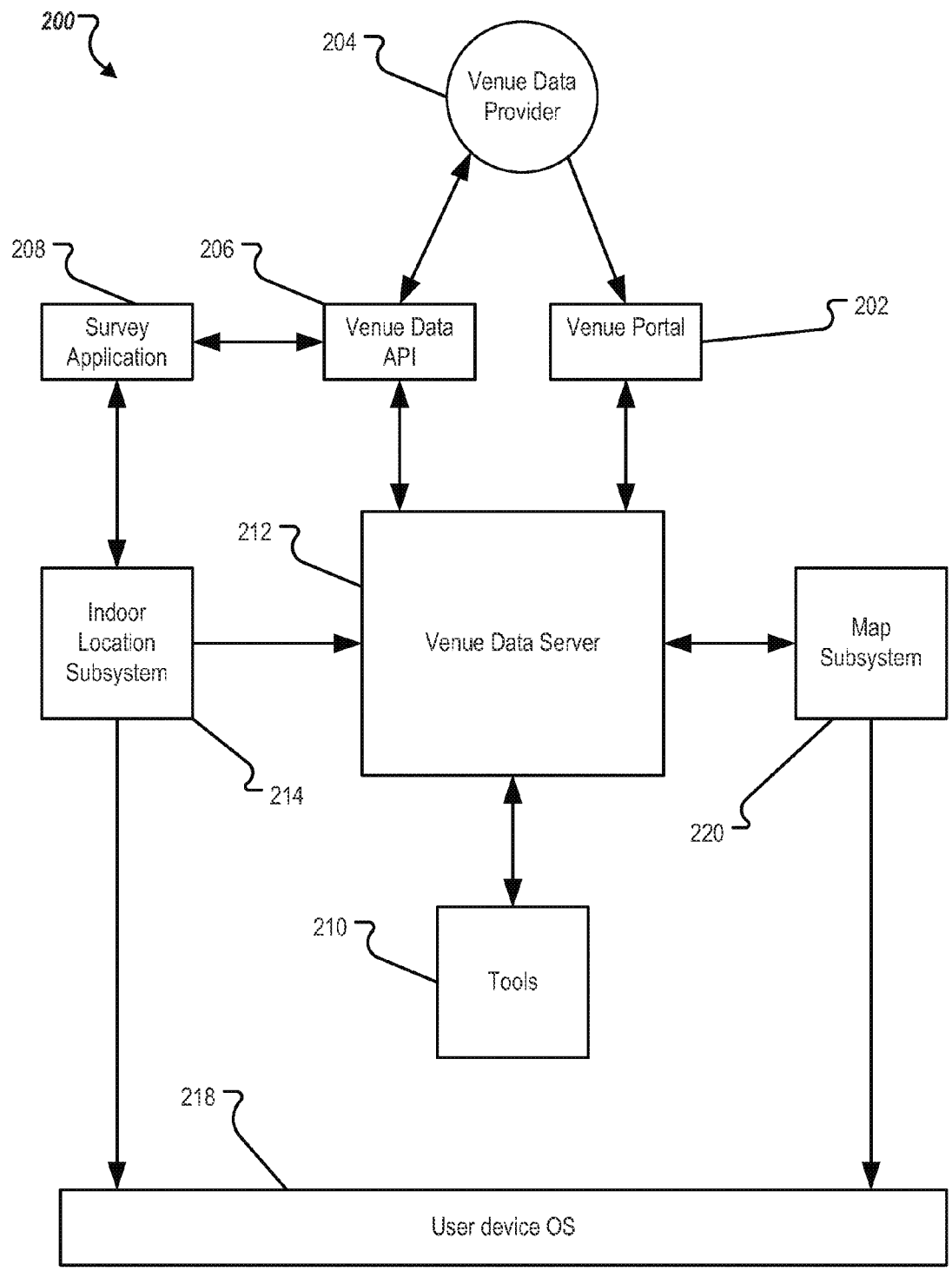
FIG. 2 is a block diagram illustrating an exemplary architecture of a venue data service system.

FIG. 2 is a block diagram illustrating an exemplary architecture of a venue data service system 200. Venue data service system 200 can be implemented on one or more computers, and in one or more data centers. Each component of the venue data service system 200 can include hardware and software, firmware, or cloudware components.

Venue data service system 200 can include venue portal 202. Venue portal 202 is a component of the venue data service system 200 configured to allow a venue data provider to self-serve for indoor positioning and map management. Venue portal 202 can include an interface for communicating with the venue data provider 204. Venue portal 202 can be configured to process venue data provider sign up, user management and organization of the venue data provider 204, data collection, survey management, and reporting.

Venue data service system 200 can include venue application programming interface (API) 206. Venue API 206 can include a set of specifications for interfacing between venue data service system 200 and venue data provider computers, map maker programs, and sampling devices for conducting surveys. Venue API 206 can include hypertext transfer protocol (HTTP) specifications for receiving venue data from streaming, and for providing validation. Venue API 206 can include specifications for providing and receiving data from survey application programs executing on one or more sampling devices.

Venue data service system 200 can include one or more survey application programs 208. A survey application program 208 can execute on a sampling device and provide location fingerprinting operations including recording sensor readings of the sampling device, respective locations of the sensor readings, and respective timestamps the readings are recorded. Survey application program 208 can record, from input of a surveyor, ground truth of a venue. The ground truth can include both geometry and attribution pertaining to any physical or conceptual feature within the target venue, such as the name of an occupant of a venue, a POI in a venue (e.g., a water fountain or an information booth in a building), a zone of interest in a venue (e.g., a "frozen food" or "bakery" section of a grocery store) and geometry of the venue (e.g., a pathway or aisle not described in the venue data).

Venue data service system 200 can include one or more venue tools 210. Venue tools 210 can include workflow management tools for managing the workflow, e.g., workflow 100 of FIG. 1. Venue tools 210 can include organization management tools, survey management tools, and indoor map workflow management tools for review, validation analysis, venue data difference analysis, venue data editing, and workflow for approving venue data. Venue tools 210 can include components for building footprint validation, road network validation and connectivity, flyover validation, and three-dimensional visualization of venue data.

Venue data service system 200 can include venue data server 212. Venue data server 212 includes one or more computer processors programmed to process venue data, including extracting and validating features extracted from the venue data. Venue data server 212 can read and write the features from a feature database according to specifications of an API, e.g., a JavaScript object notation (JSON) API, GeoJSON, TopoJSON, or Apple Venue Format (AVF). Venue data server 212 can implement geographic information system (GIS) versioning, and manage change in venue data due to construction, demolition, and change of tenants. Venue data server 212 can track a change history for each venue and features within, providing tagging support including geotagging support. Venue data server 212 can perform property level localization, including identifying languages and translating various venue and feature attributes, e.g., names, to various languages and locales.

Venue data server 212 can provide venue data to indoor location subsystem 214. Indoor location subsystem 214 is a component of venue data service system 200 configured to provide venue data and location fingerprint data to user device operating system 218 for determining a location of a user device in a venue. Venue data server 212 can provide venue data to map subsystem 220. Map subsystem 220 is a component of venue data service system 200 configured to generate a map of a venue, integrate a venue map with other geographic maps, and provide the maps to user device operating system 218 for displaying indoor structures of the venue.

Figure 3:
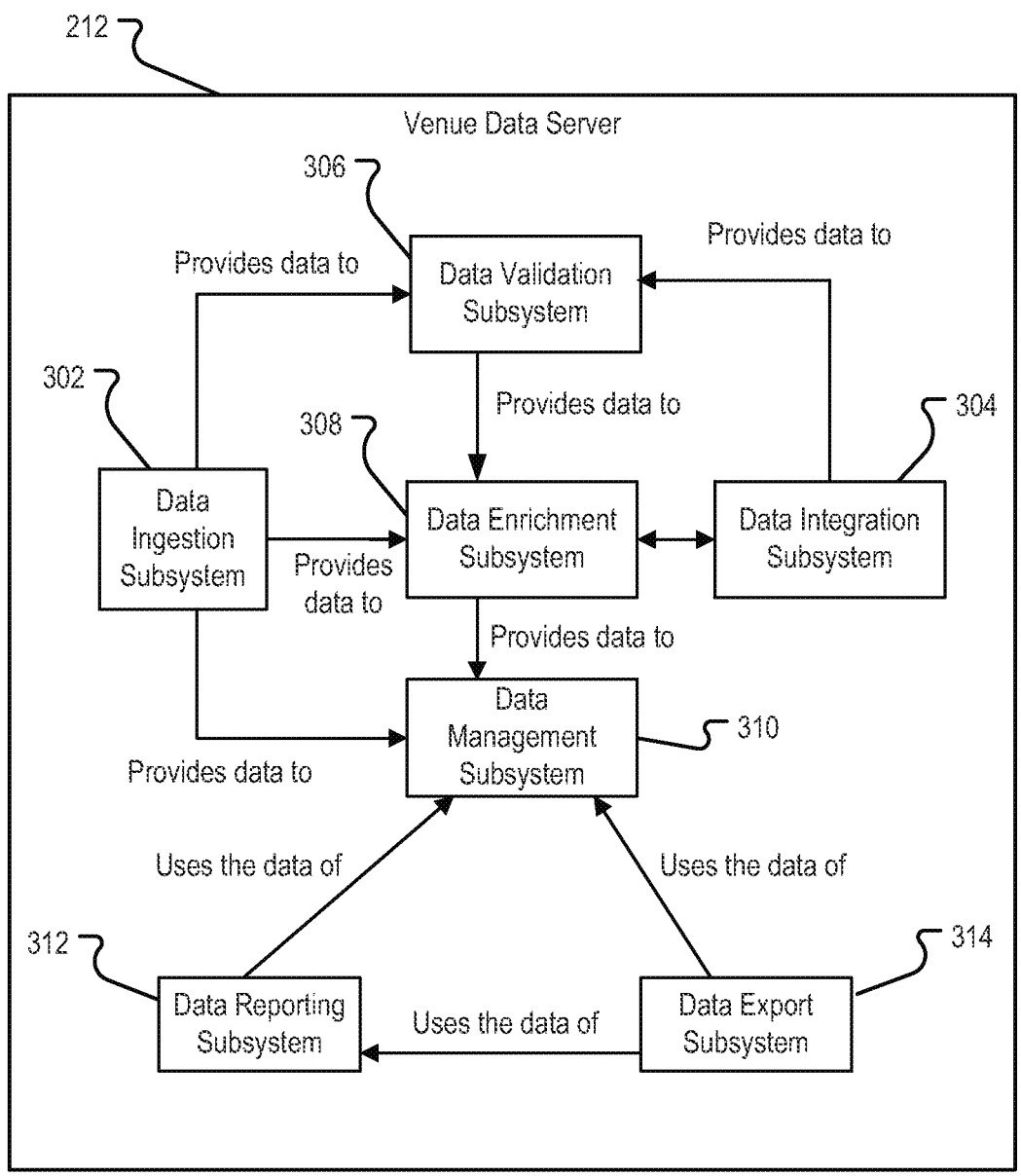
FIG. 3 is a block diagram illustrating components of an exemplary venue data server of a venue data service system.

FIG. 3 is a block diagram illustrating components of an exemplary venue data server 212 of a venue data service system. Each component of venue data server 212 can include one or more processors with shared or individual data storage system.

Venue data server 212 can include data ingestion subsystem 302. Data ingestion subsystem 302 is a component of venue data server 212 configured to receive venue data from a venue portal. Data ingestion subsystem 302 can also be responsible for mapping various external data format, e.g., external data schemas, to internal data format used by data management subsystem 310, as well as mapping external third party feature categories to internal feature categories. Venue data server 212 can include data integration subsystem 304. Data integration subsystem 304 is a component of venue data server 212 configured to integrate received venue data with data from other data sources using a variety of processes including rule and pattern based integration, spatial analysis, content driven categorization, machine learning, and adaptive algorithms. One of the roles of the data integration subsystem is to transform and filter the data from other sources to make the data contextually relevant for venue data correction and enrichment.

Venue data server 212 can include data validation subsystem 306. Data validation subsystem 306 is a component of venue data server 212 configured to perform validation on venue data from data ingestion subsystem 302 and integrated data from data integration subsystem 304 using various validation rules and mining existing venue data for detection of new validation rules and validation processes. Data validation subsystem 306 can also be connected to tools and applications used for manual data validation.

Venue data server 212 can include data enrichment subsystem 308. Data enrichment subsystem 308 is a component of venue data server 212 configured to enrich validated venue data for data validation subsystem 306 and data from data integration subsystem 304 before storing the enriched venue data. Data enrichment subsystem 308 can perform various tasks. For example, data enrichment subsystem 308 can identify missing attributes that can be useful for data validation and user experience improvement purposes. Second, it needs to identify optimal sources to augment the missing information. In addition, if a particular brand or national chain has an official mobile application, data enrichment subsystem 308 can link the official mobile application to a record in an App Store database to allow the device to automatically launch appropriate app when the user enters the chain's store. Data enrichment subsystem 308 can also be connected to tools and applications used for manual data enhancements.

Venue data server 212 can include data management subsystem 310. Data management subsystem 310 is a component of venue data server 212 configured to perform change management and workflow processes applied to all content consumed by the system. Venue data ingested into the system can be stored in data management subsystem 310 throughout each phase of validation, integration, enrichment, and reporting in a manner supporting the retrieval of historical or current state along with a complete audit trail of all modifications made to the data by any actor.

Venue data server 212 can include data reporting subsystem 312. Data reporting subsystem 312 is a component of venue data server 212 configured to collect and aggregate venue data and other data stored in various portions of data management subsystem 310. Data reporting subsystem 312 can then generate reports and visualization of the collected and aggregated data.

Venue data server 212 can include data export subsystem 314. Data export subsystem 314 is a component of venue data server 212 configured to export the reports and the visualization produced by data reporting subsystem 312, as well as the venue data and other data stored in various portions of data management subsystem 310 in various file formats to various systems. Data export subsystem 314 can also handle mappings between internal and external data formats, e.g., schemas.

Figure 4:
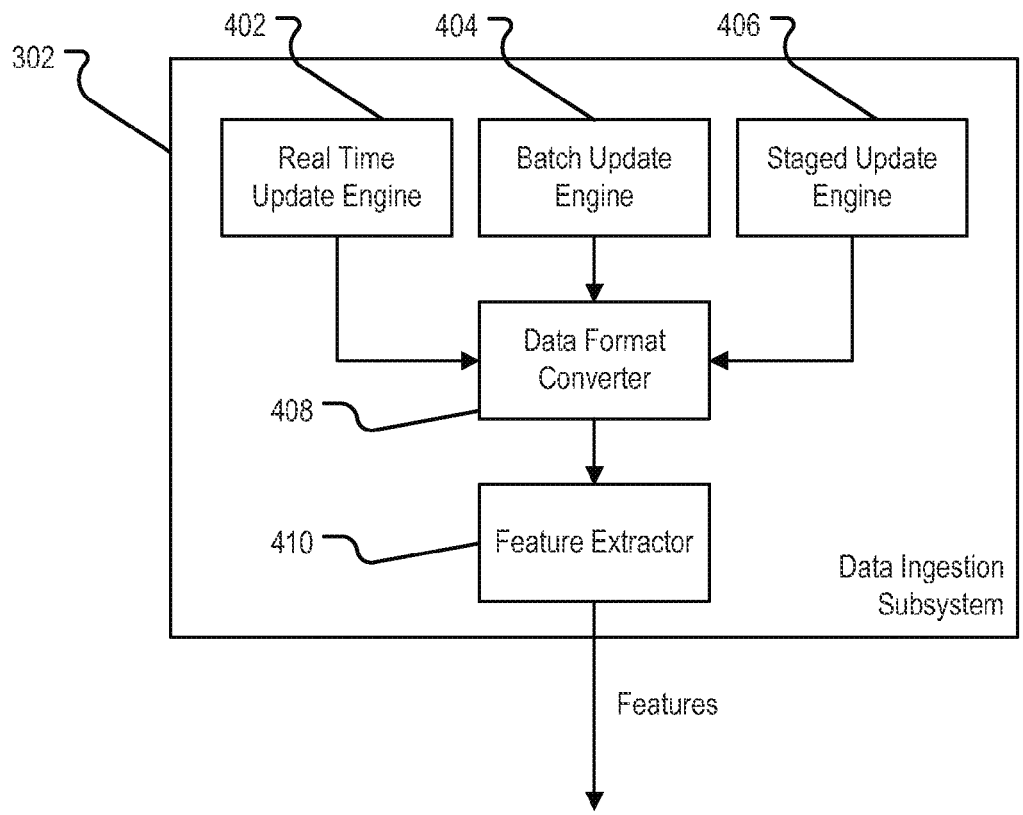
FIG. 4 is a block diagram illustrating components of an exemplary data ingestion subsystem of a venue data service system.

FIG. 4 is a block diagram illustrating components of an exemplary data ingestion subsystem 302 of a venue data server. Data ingestion subsystem 302 can include real time update engine 402. Real time update engine 402 is a component of data ingestion subsystem 302 configured to receive real time updates from venue portal 202 (of FIG. 2) that provide venue data or change a portion of already uploaded venue data.

Data ingestion subsystem 302 can include batch update engine 404. Batch update engine 404 is a component of data ingestion subsystem 302 configured to receive batch updates from venue portal 202 (of FIG. 2) that provide venue data. The batch updates can occur according to a batch update scheduler executing on a venue data provider computer or in batch update engine 404.

Data ingestion subsystem 302 can include staged update engine 406. Stage update engine 406 is a component of data ingestion subsystem 302 configured to receive staged updates to venue data. In some implementations, data on changes to a venue can be submitted as a delta package relative to a specific state of the venue being modified. Change submissions can be isolated in a dedicated staging area to prevent pollution of feature data stores, and are summarily processed by automated processes or by administrative users. The processing can be based on, for example, outcome of a validation, data enrichment process, or categorization of the venue. Stage update engine 406 can automatically collect and aggregate multiple, non-conflicting change submissions made against the same state of a venue for reducing number of changes.

Data ingestion subsystem 302 can include data format converter 408. Data format converter 408 is a component of data ingestion subsystem 302 configured to process inbound venue data and other data from various data sources, including venue data provider computers, to generate payload data for further processing. Payload data is a broader set of input data that can include venue data or survey data, and additional information about a user, location, and device performing action.

Data ingestion subsystem 302 can include feature extractor 410. Feature extractor 410 is a component of data ingestion subsystem 302 configured to extract or generate features, including records representing physical features and records representing conceptual features, for further processing including validation by data validation subsystem 306, enrichment by data enrichment subsystem 308, and storage by data management subsystem 310.

Figure 5:
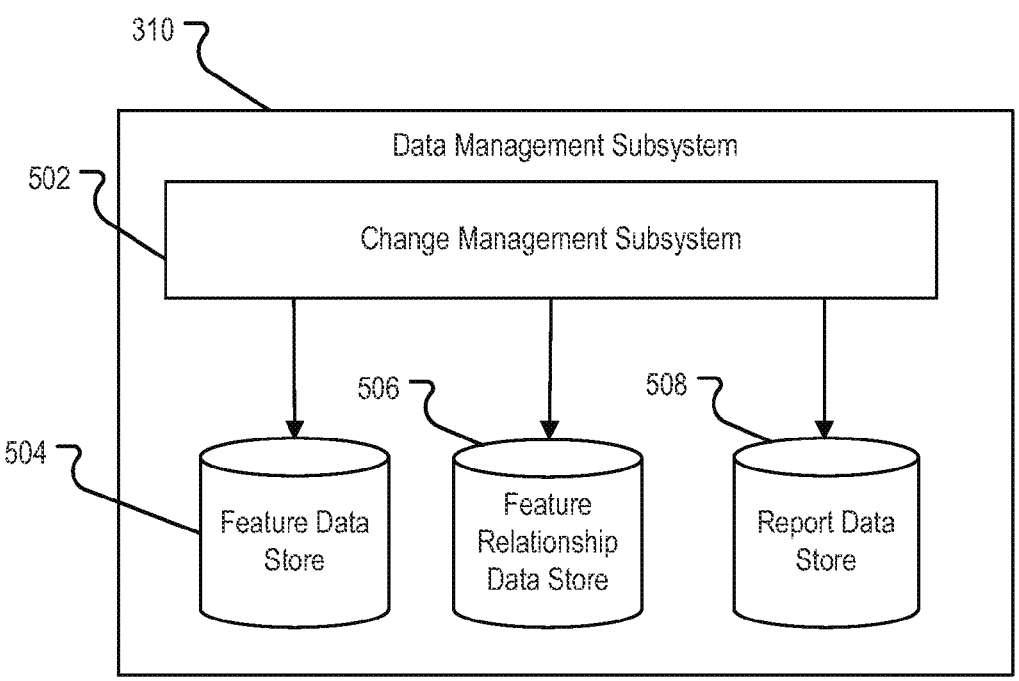
FIG. 5 is a block diagram illustrating components of an exemplary data management subsystem of a venue data server.

FIG. 5 is a block diagram illustrating components of an exemplary data management subsystem 310 of a venue data server. Data management subsystem 310 can include change management subsystem 502. Change management subsystem 502 is a component of data management subsystem 310 configured to perform uniform version control of all content, including venue data, ingested by the system. The version control can include application and enforcement of change management procedures to safeguard the system from data corruption. Change management subsystem 502 can provide direct, on-demand access to historical states of an entity, collection of entities or relationships between entities. Change management subsystem 502 can provide an audit trail for actions taken by an actor, e.g., a user, an administrator, or a process. Change management subsystem 502 can record and report a delta between any two states of an entity, collection of entities or relationships between entities, regardless of whether the two states are temporally sequential to one another.

Data management subsystem 310 can include feature data store 504. Feature data store 504 is a component of data management subsystem 310 configured to store feature data, including descriptions of physical features and conceptual features. Feature data store 504 can store historical and current data, raw data received by the venue data server or data already processed by the venue data server. All feature data can be localized.

Data management subsystem 310 can include feature relationship data store 506. Feature relationship data store 506 is a component of data management subsystem 310 configured to store feature relationship data, including records of which physical feature includes which physical feature, which conceptual feature occupies which physical feature, and which conceptual feature includes which conceptual feature. Feature relationship data store 506 can store historical and current data, raw data received by the venue data server or data already processed by the venue data server. Feature relationships can be unidirectional and bidirectional.

Data management subsystem 310 can include report data store 508. Report data store 508 is a component of data management subsystem 310 configured to store report data, including visualizations of maps, data change history, and data on exceptions, corrections, and errors detected in past submission of venue data.

Figure 6:
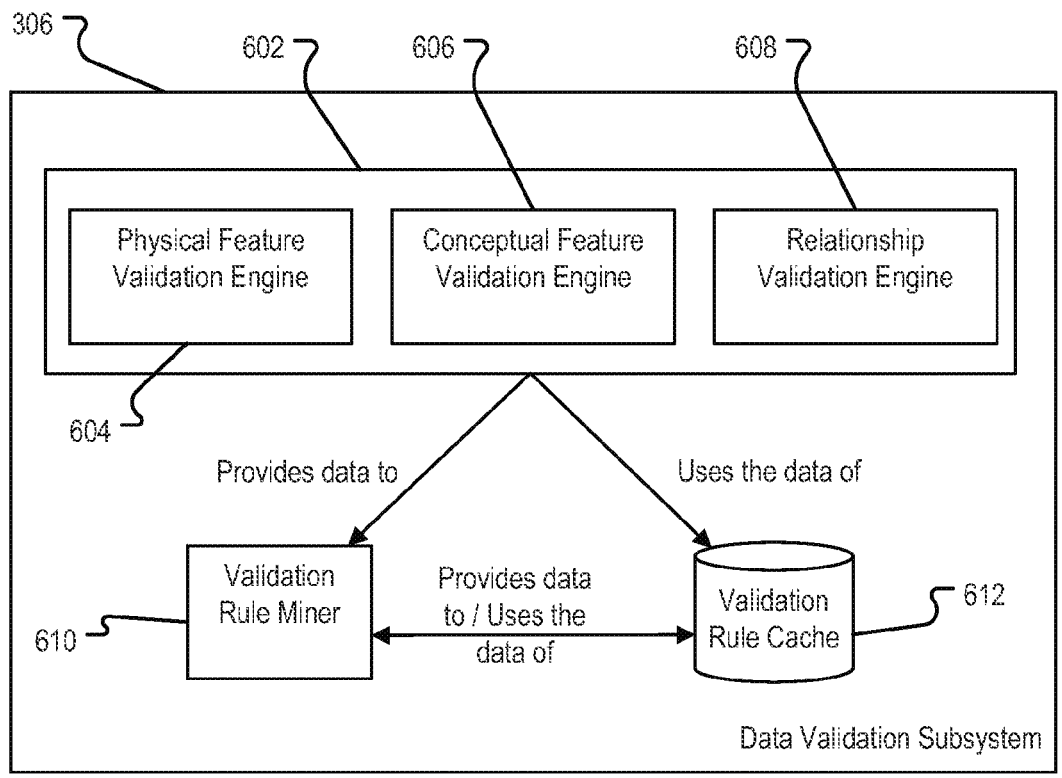
FIG. 6 is a block diagram illustrating components of an exemplary data validation subsystem of a venue data server.

FIG. 6 is a block diagram illustrating components of an exemplary data validation subsystem 306 of a venue data server. Data validation subsystem 306 can include validation engine 602 for validating venue data as well as integrated data including venue data and other data.

Validation engine 602 can include physical feature validation engine 604. Physical feature validation engine 604 is a component of validation engine 602 configured to validate feature content representing material structures based on real world, physical constraints using a combination of pre-existing and programmatically derived rules and known exceptions. For example, physical feature validation engine 604 can validate a point feature, e.g., a POI, by determining whether the point feature is located within a venue, a building of the venue, a floor of the venue, or a unit of the venue as provided in the venue data by comparing a location of the point feature with ground truth data received from a sampling device. Physical feature validation engine 604 can validate a line feature, e.g., a pathway, by determining whether the pathway is contained in a venue. Physical feature validation engine 604 can validate a polygon feature, e.g., a footprint of a floor, by comparing the polygon feature with a higher-level feature, e.g., a building in which the floor is located.

Validation engine 602 can include conceptual feature validation engine 606. Conceptual feature validation engine 606 is a component of validation engine 602 configured to validate conceptual features, including entities associated with physical features or other conceptual features based on a combination of pre-existing and programmatically derived rules and known exceptions, learned behavior, and business rules. For example, venue data indicating that ABC store is located at a particular level (e.g., first floor) of a building can be validated by data indicating that one or more mobile devices entered a search query for "ABC store coupons," the search query being answered by a search engine through a wireless access point located at the level of the building. The location of ABC store can be confirmed by probe data points and application launch data indicating that ABC store's store-specific application is being launched and used in or near the store.

Validation engine 602 can include relationship validation engine 608. Relationship validation engine 608 is a component of validation engine 602 configured to validate declared or inferred relationships between two or more features. Each of the features can be physical and conceptual. The features can be within a single venue or across multiple venues. The validation can be based on a combination of pre-existing manually created and programmatically derived rules and known exceptions.

Data validation subsystem 306 can include validation rule miner 610. Validation rule miner 610 is a component of data validation subsystem 306 configured to identify and propose validation related rules based on pre-existing venue data content, curated validation rules, cached validation exception reports, and manually entered known exceptions to existing rules. Validation rule miner 610 can produce a continuous feedback cycle of known and potential invalid or permissible states of features and association between features using patterns identified during analysis of inbound content both in isolation and against cached exception reports. Validation rule miner 610 can store the states and association between features in validation rule cache 612.

Validation rule cache 612 is a component of data validation subsystem 306 configured to store manually curated and programmatically derived or mined rules used for determining validity of a feature's content both in isolation and with respect to other features with which the feature is associated. Validation engine 602 can determine the validity using rules stored in validation rule cache 612 in the context of an indoor venue and the venue's immediate surrounding context.

Figure 7:
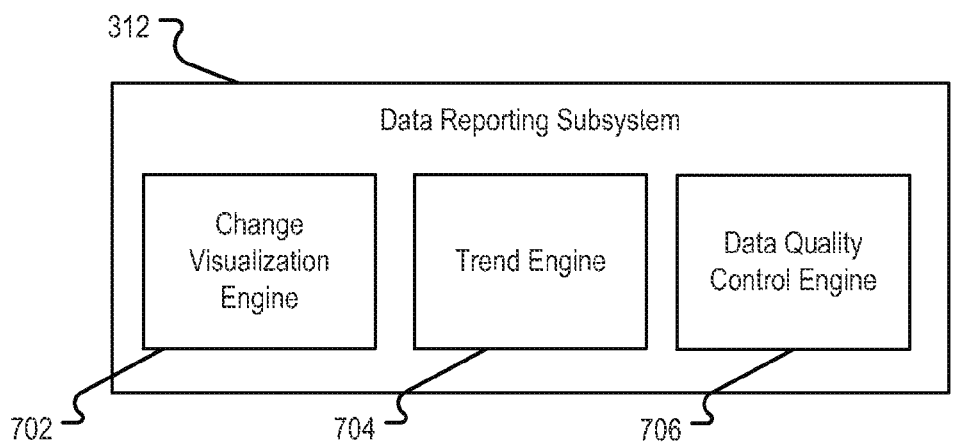
FIG. 7 is a block diagram illustrating components of an exemplary data reporting subsystem of a venue data server.

FIG. 7 is a block diagram illustrating components of an exemplary data reporting subsystem 312 of a venue data server. Data reporting subsystem 312 can include change visualization engine 702. Change visualization engine 702 is a component of data reporting subsystem 312 configured to retrieve or extract content from data management subsystem 310 or data integration subsystem 304 for visualizing, querying, filtering, and reporting on change to content over a specified period of time.

Data reporting subsystem 312 can include trend engine 704. Trend engine 704 is a component of data reporting subsystem 312 configured to analyze trend from pre-computed and cached data reports. Trend analysis can include measuring, highlighting, and correlating improvements or degradations in venue data quality, coverage, and usage over time.

Data reporting subsystem 312 can include data quality control engine 706. Data quality control engine 706 is a component of data reporting subsystem 312 configured to receive and manage data quality rules and patterns based on entities both in isolation and as they relate to one another. For example, data quality control engine 706 can store one or more data quality thresholds defined to prevent venue and site survey data from being published to production and visible to the end user. Data quality control engine 706 can store a data quality rule for site surveys that prevents indoor positioning from being enabled in case the site surveyor did not cover all walk-able paths or areas within the venue before the survey results are published and indoor positioning enabled. Data quality control engine 706 can notify a data source, e.g., a venue data provider, or surveyor of violations of ingested data of known data quality rules, policies and expectations.

Figure 8A:
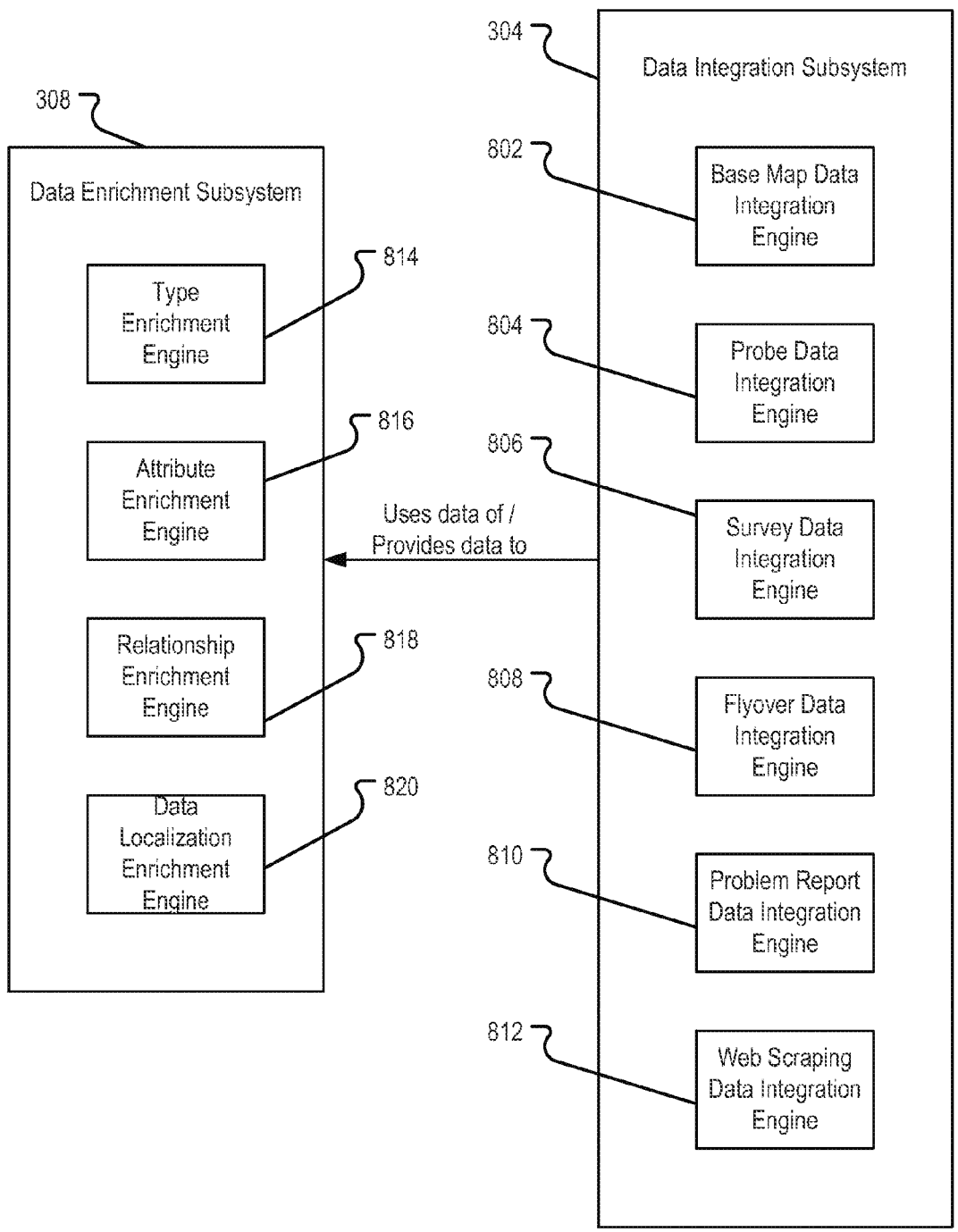
FIG. 8A is a block diagram illustrating components of an exemplary data enrichment subsystem of a venue data server and an exemplary data integration subsystem of the venue data server.

FIG. 8A is a block diagram illustrating components of an exemplary data enrichment subsystem 308 of a venue data server and an exemplary data integration subsystem 304 of the venue data server.

Data integration subsystem 304 can include base map integration engine 802. Base map integration engine 802 is a component of data integration subsystem 304 configured to integrate venue data with base map data. The base map data can include geometry, topology, navigable road, pedestrian, and transit networks, as well as other content layers used as a data source for various validation, data enrichment and reporting processes when consuming and processing inbound content from data ingestion subsystem 302 and requests from data reporting subsystem 312. For example, base map integration engine 802 can align a venue feature with a base map record of a property lot, and analyze venue feature geometry against existing base map features. The analysis can include identifying a match, or detecting a conflict, between a venue feature and one contained in the base map, e.g., a building footprint intersecting a portion of a navigable road network, or a venue walkway that may be a part of a trail, and an existing base map feature representing the same trail. Base map integration engine 802 can verify and analyze venue entry and exit points. Once the correct entry and exit points are identified, they can be linked to road, pedestrian, and transit networks to enable "door-to-door" multi-modal routing and guidance.

Data integration subsystem 304 can include probe data integration engine 804. Probe data integration engine 804 is a component of data integration subsystem 304 configured to store, filter, and cluster probe data gathered from a variety of mobile devices and integrate venue data with the probe data. The probe data can include coordinates, e.g., latitude, longitude, and altitude, speed and direction of travel, timestamp, device information, and in some situations special sensor readings. Probe data, when integrated with venue data, can help increase confidence and accuracy of determining a location inside of a venue, for example, by giving a greater weight to an estimated location that has been frequented by mobile devices in the past. Probe data can also be used to identify recently closed or opened additions to venue. These could be smaller areas within existing buildings and entire new floors or even buildings. Probe data can also be used to confirm or define opening and closing times for venues and individual stores.

Data integration subsystem 304 can include survey data integration engine 806. Survey integration engine 806 is a component of data integration subsystem 304 that includes a repository of content, including survey data, captured during on-site surveys of venues. Survey integration engine 806 can align subsequent deliveries of venue data on a previously ingested venue against existing survey data. Survey integration engine 806 can detect compatibility or conflicts within existing surveys of multiple states of the same building or venue. Survey integration engine 806 can determine spatial changes to a venue. Survey integration engine 806 can perform recurring alignment with probe data stored in probe data integration engine 804 to identify potential need to resurvey. For example, if probe data shows that multiple mobile devices have crossed what is marked in the venue data as a wall or other known obstruction, the survey data integration engine may determine a resurvey of the venue is necessary. The opposite can be true as well. If survey paths cross what is marked in the venue data as a wall or other known obstruction, survey integration engine 806 may notify the data validation subsystem 306 that the venue data requires corrections.

Data integration subsystem 304 can include flyover data integration engine 808. Flyover data integration engine 808 is a component of data integration subsystem 304 configured to overlay three-dimensional flyover data over venue data to programmatically and visually inspect inbound venue data for inconsistencies in building geometry within the venue data and within the flyover data.

Data integration subsystem 304 can include problem report data integration engine 810. Problem report data integration engine 810 is a component of data integration subsystem 304 configured to store records of issues reported by end users against base map data stored in base map data integration engine 802 and against other content layers. Problem report data integration engine 810 can use the records as a data source for various validation, data enrichment and reporting processes when consuming and processing inbound content from data ingestion subsystem 302 and requests from data reporting subsystem 312. Structured problem reports can be directly bound to a venue and feature(s) within it. Unstructured problem reports can be manually inspected or automatically analyzed using natural language processing algorithms to link them to appropriate venues and features within them.

Data integration subsystem 304 can include web scraping data integration engine 812. Web scraping data integration engine 812 is a component of data integration subsystem 304 configured to store data collected from a variety of publicly accessible online resources. Web scraping data integration engine 812 can use the data as a data source for various validation, data enrichment and reporting processes when consuming and processing inbound content from data ingestion subsystem 302 and requests from data reporting subsystem 312.

Data enrichment subsystem 308 can include type enrichment engine 814. Type enrichment engine 814 is a component of data enrichment subsystem 308 configured to interpret one or more features and their declared or inferred data types, including possible transformation, aggregation or re-interpretation as one or more individual features, from external to internal concepts or structures. Type enrichment can include determining previously unknown information based on context. For example, information identifying an area outside of a shopping mall as a parking lot may be missing. Type enrichment engine 814 can discover the missing information based on the shape of the area and other features associated with the area, venue type and size, e.g., entrances and exits or a payment booth.

Data enrichment subsystem 308 can include attribute enrichment engine 816. Attribute enrichment engine 816 is a component of data enrichment subsystem 308 configured to add, remove, replace or disassemble feature attribution using information from other internal or external systems. For example, a venue data set may contain only textual information. Attribute enrichment engine 816 may look for public geo-tagged photos taken at the venue to provide better user experience when displaying venue information. The engine may also use search and user interaction logs to determine frequently used attributes and then find and aggregate them from other systems. For example, if a venue tweets a lot about promotions and coupons, the attribute enrichment engine may decide to add a Twitter handle for the venue or store within it.

Data enrichment subsystem 308 can include relationship enrichment engine 818. Relationship enrichment engine 818 is a component of data enrichment subsystem 308 configured to associate features within a single venue or between multiple venues. These associations can be derived from both physical and logical characteristics of their relations. For example, relationship enrichment engine 818 can use a set of relations derived from physical locations of stores within a shopping mall for natural guidance and routing. Relationship enrichment engine 818 can use stores' latitudes, longitudes, and altitudes for level information) to create relationships such as: store A is located NORTH of, SOUTH of, EAST of, WEST of, LEFT to, RIGHT to, ABOVE, or BELOW store B. Based on the relationship "distance" information, relationship enrichment engine 818 can provide routing instructions, for example, "ABC Store is in front of you, two stores after you pass the DEF store."

Data enrichment subsystem 308 can include data localization enrichment engine 820. Data localization enrichment engine 820 is a component of data enrichment subsystem 308 configured to translate a venue name or address to various languages for localization. Data localization can include other non-language data conversions to accommodate locale's preferences, e.g., date and time, volume, area, distance, currency and temperature measurements.

Figure 8B:
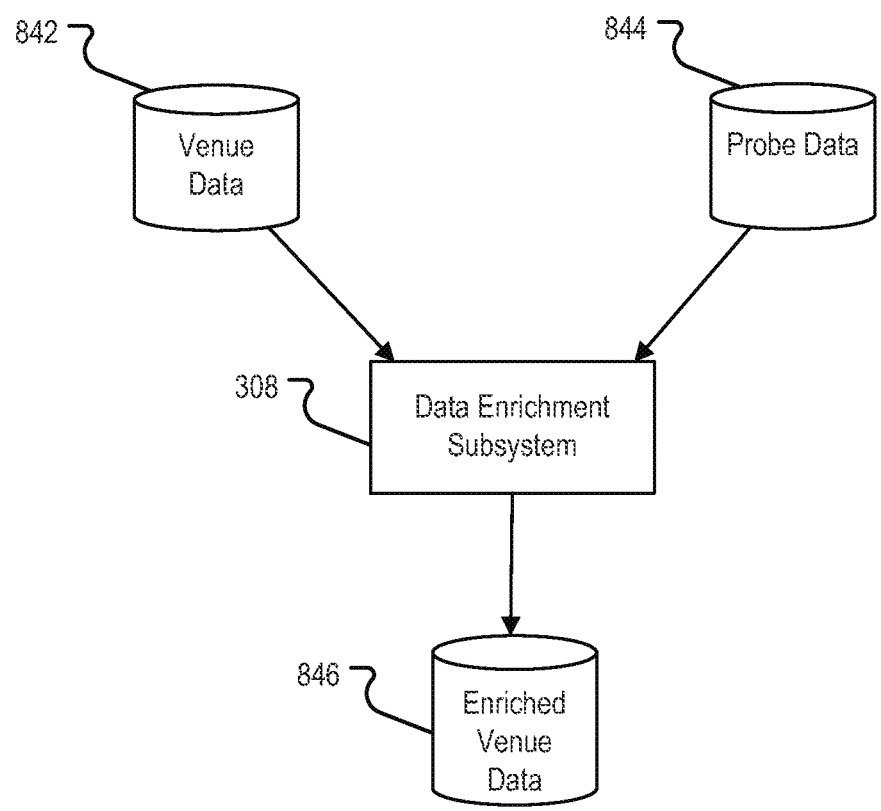
FIG. 8B is a block diagram illustrating venue data enrichment techniques.

FIG. 8B is a block diagram illustrating venue data enrichment techniques. Data enrichment subsystem 308 can receive venue data from venue data store 842. Data enrichment subsystem 308 can receive probe data from probe data store 844. Probe data can include crowd-source data. Data enrichment system 308 can enrich the venue data using the probe data. Enriching the venue data can include correcting inconsistencies in the venue data or adding information to the venue data. Data enrichment subsystem 308 can store enriched venue data in enriched venue data store 846.

Examples of enriching venue data can include the following. Data enrichment subsystem 308 can determine unit and occupant feature category based on probe data and application launches. Data enrichment subsystem 308 can use size of physical venue features, e.g. buildings, floors and units, along with categorization and other attribution to validate existing features, or detect potentially missing or anomalous associated features of other types along with quantity or attribution. For example, the size and categorization of a venue and its associated buildings can be used to validate and report on whether or not a typical number of correlated features, such as public restrooms or handicap accessible entry points, are present.

Data enrichment subsystem 308 can use probe data, including venue survey data, to identify physical features missing from venue data, e.g. a portion of a floor or units missing where probe data has detected pedestrian traffic or site surveys have reported portions of a floor plan not captured with the existing venue map.

Data enrichment subsystem 308 can use base map data, probe data and venue data to validate existing or identify missing venue entry points, and determine the connection points between indoor venue data and the existing navigable road network in the base map.

Data enrichment subsystem 308 can use probe data's spatial and temporal information to determine optimal times for site surveys to avoid crowded days and time intervals at target venues.

Data enrichment subsystem 308 can use a positioning subsystem of a mobile device, e.g., a GPS or GLONASS receiver, to detect areas in a venue that have satellite signal coverage. Data enrichment subsystem 308 can then detect balconies or other exposed spaces associated with a venue.

Data enrichment subsystem 308 can use probe data velocity and altitude information to determine mode of transportation and physical feature types within a venue. For example, data enrichment subsystem 308 can detect and verify escalators, elevator banks, stairwells, etc. Data enrichment subsystem 308 can distinguish these areas from other pedestrian foot traffic areas.

Data enrichment subsystem 308 can use probe data to detect changes in pedestrian traffic patterns to notify of the potential need to re-survey or update geometry at a venue site. Data enrichment subsystem 308 can validate and enhance hours of operation based on app launches and coupon redemption data.

Figure 9:
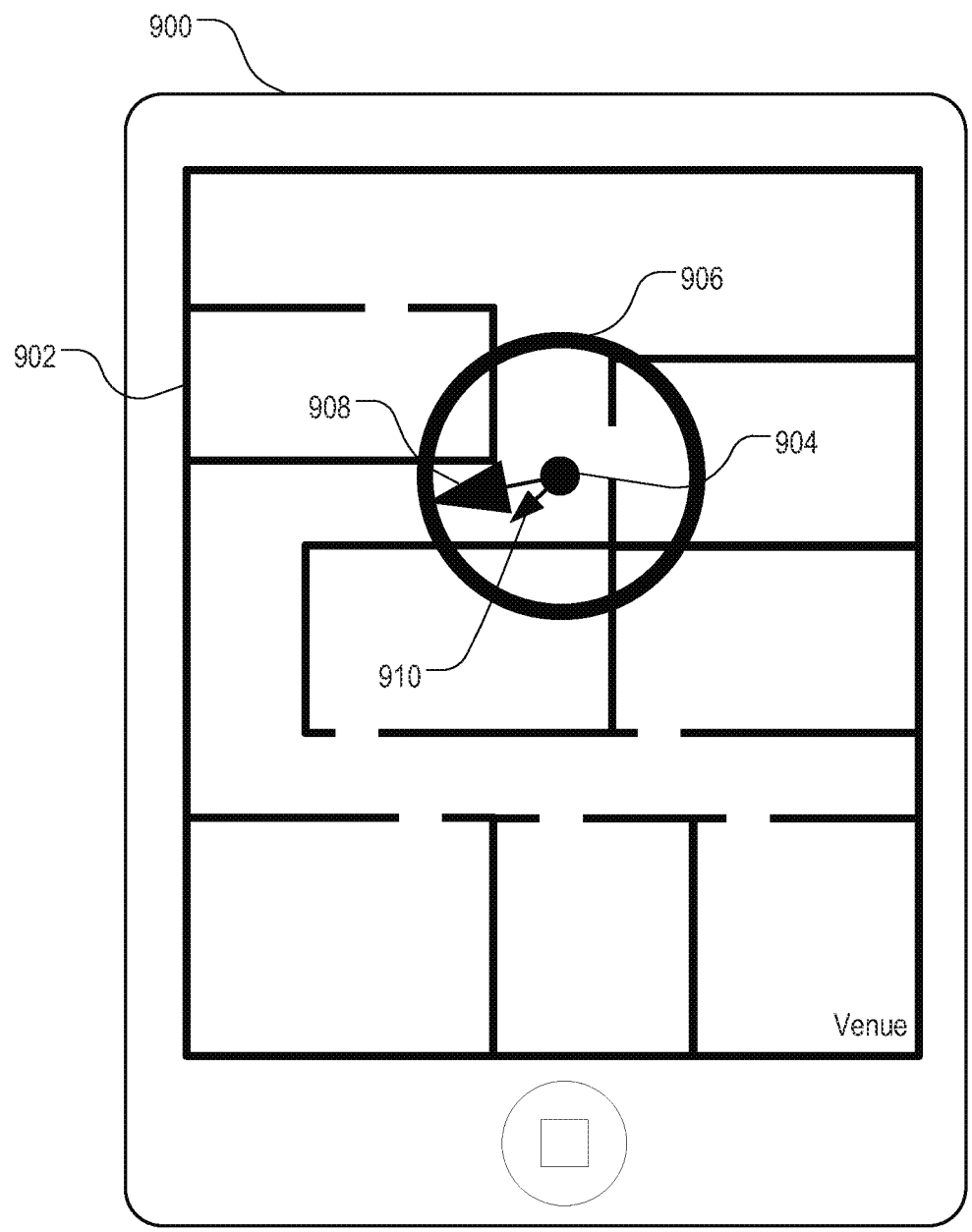
FIG. 9 illustrates an exemplary user interface for displaying an estimated location of a user device in a venue.

FIG. 9 illustrates an exemplary user interface 902 for displaying an estimated location of a user device in a venue. User interface 902 can be displayed on user device 900 configured to determine an indoor location using venue data and location fingerprint data. An indoor location can be a location where signals from a satellite positioning system, GPS, are unavailable, not sufficiently accurate, or otherwise undesirable for determining a location. The indoor location may be a location in a venue that is, for example, a building, a cave, or multi-level underground structure. The indoor location may include latitude and longitude coordinates, and level name and number, or coordinates relative to the venue, e.g., X meters to the left and Y meters ahead of a reference point.

User interface 902 can include a map of at least a portion of the venue, and location indicator 904 overlaid on the map. The map can be a map of a building or a level of a building. The map can be generated from venue data. The map can be generated by venue data service system 200 or by user device 900.

Location indicator 904 can be a marker, e.g., a dot, circle, or pin, that indicates an estimated location of user device 900 in the venue. Location indicator 904 may be surrounded by accuracy indicator 906. Accuracy indicator 906 can be a circle, square, or other geometric shape. A size of accuracy indicator 906 can indicate an estimated error margin of the location of user device 900, where a larger size indicates a larger estimated error margin.

Location indicator 904 and associated accuracy indicator 906 can move as the estimated location changes, e.g., when user device 900 is carried by a user walking in the venue. As user device 900 moves, location indicator 904 can be associated with heading indicator 908. Heading indicator 908 can be an arrow pointing from location indicator 904 to an estimated heading of user device 900. User device 900 can determine the estimated location and estimated heading using measurements of signals received by user device 900 or using signals that are expected to be received but not actually received by user device 900. The signals can be radio frequency (RF) signals. The estimated heading may be different from a heading determined using a gyroscope or a magnetometer, e.g., a mechanical or electronic compass, which may be subject to various forms of interference. User device 900 can overlay marker 910 on the map. Marker 910 can indicate a heading as determined using the gyroscope or a magnetometer on the map. Marker 910 can be an arrow pointing to the heading from location indicator 904. This arrow may point to a different direction than a direction of heading indicator 908.

Exemplary Procedures

Figure 10:
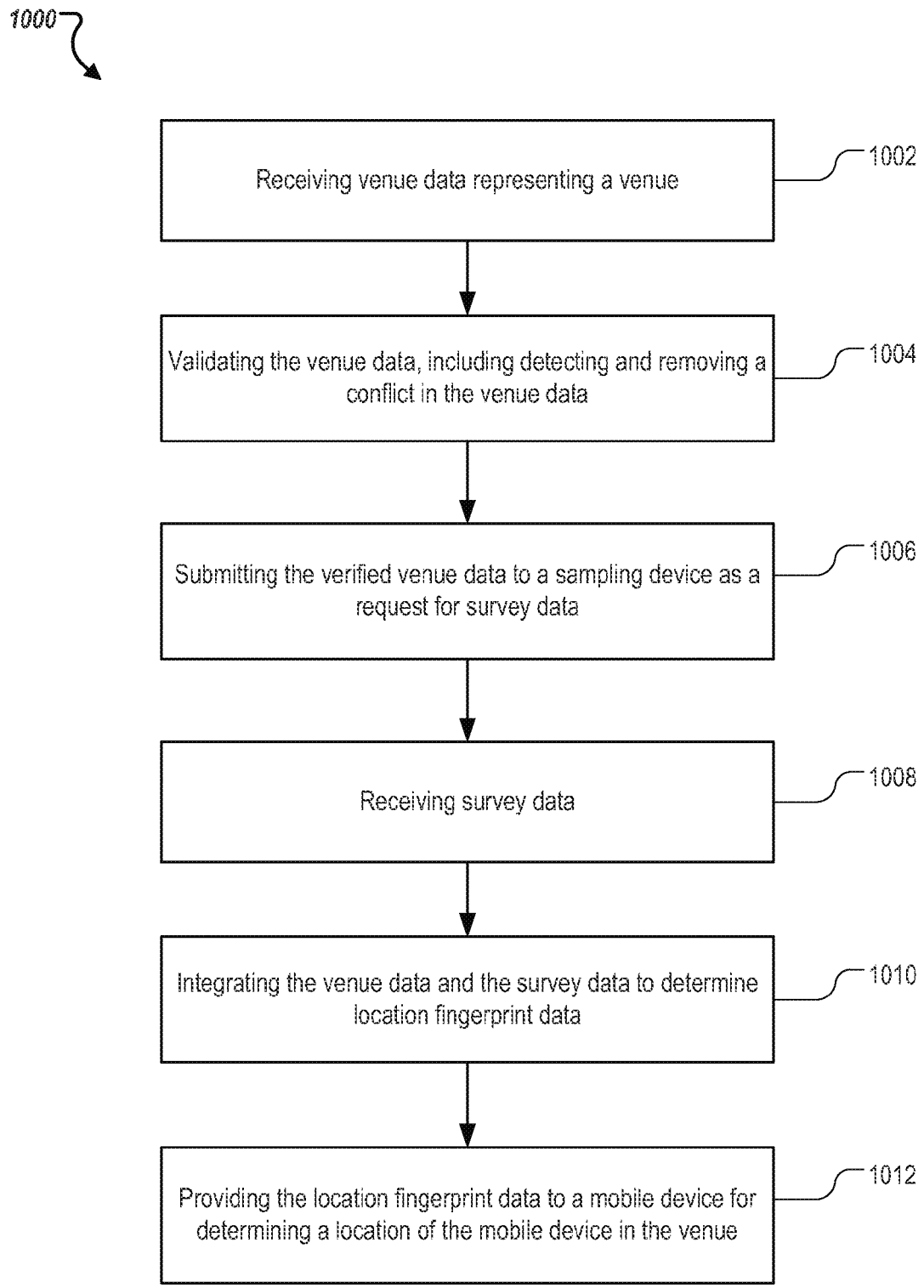
FIG. 10 is a flowchart of an exemplary process of venue data processing.

FIG. 10 is a flowchart of an exemplary process 1000 of venue data processing. Process 1000 can be performed by a system including one or more computer processors, e.g., venue data server 212 of FIG. 2.

The system can receive (1002) from a venue data provider computer, venue data through a venue portal. The venue data can include a representation of geographic and geometric attributes of the venue and records of occupants of the venue. The venue data can be received through a web upload according to a venue data upload API using real time submission from the venue data provider computer or using a batch data pull by the system from the venue data provider computer.

The system can validate (1004) the venue data, including detecting, marking and/or removal of conflicts or malformed content in the venue data according to a rule set. The rules can define the conflict as a conflict between attributes of the venue or a conflict between attributes of the venue and pre-loaded geographic data or occupant data. Validating the venue data can include performing at least one of building footprint validation, flyover validation, or three-dimensional visualization validation. The system can generate a venue map. The venue map can represent internal features of the venue. The venue data server can provide the venue map to a device operated by a venue date provider for review and edit.

The system can submit (1006) the validated venue data to a sampling device as a request for survey data. The sampling device can perform a survey at the venue, including being carried to various locations in the venue by a surveyor, and recording measurements of one or more environment variables, e.g., wireless signals, at each location, and associating respective timestamps and locations with the measurements. The locations can be received from an input on a map of the venue generated from the validated venue data.

For example, the system can provide to the sampling device a survey application for conducting the survey. The survey application can display a venue map generated from the venue data on a display device of the sampling device. The survey application can receive a user input at a starting location on the venue map to start the survey. When the survey is started, the survey application records sensor readings of the one or more environmental variables as detected by the sensor. The survey application associates each of the sensor readings with a respective current location of the mobile device and a respective timestamp. The survey application can then submit, in real time or in batch, the recorded sensor readings as the survey data to the system.

The system can receive (1008) the survey data from the sampling device. The survey data can include the recorded measurements of one or more environmental variables recorded by a sensor of the sampling device and associated timestamps and locations.

The system can integrate (1010) the venue data and the survey data to determine location fingerprint data. The location fingerprint data can include expected measurements of the one or more environmental variables at respective locations in the venue. Integrating the venue data and the survey data can include versioning. The system can identify the specific states of the venue that individual surveys were created against. The system can determine which states of the venue are compatible with individual surveys based on the temporal and geographic data associated with both data sets. The system can then integrate survey data, collected against one or more versions of a venue, with one or more compatible versions of the same venue data to support positioning or further analysis.

In some implementations, the system can integrate venue data with external data to generate map data that represents internal structure of the venue in a map of geographic features. The external data can include base map data representing geometry and topology of geographic features external to the venue. The external data can include probe data including anonymized location and heading information submitted by user devices. The external data can include flyover data including information on three-dimensional geographic features. The external data can include user report data including user provided corrections on the base map data or venue data. The external data can include web data on geographic features from publicly available web sites.

The system can provide (1012) the location fingerprint data to a mobile device for determining a location of the mobile device in the venue. The location can be represented by a marker on a venue map generated based on the venue data. Providing the location fingerprint data to a mobile device can include at least one of providing the location fingerprint data to the mobile device through a map service or providing the location fingerprint data to the mobile device through an indoor location service.

Figure 11A:
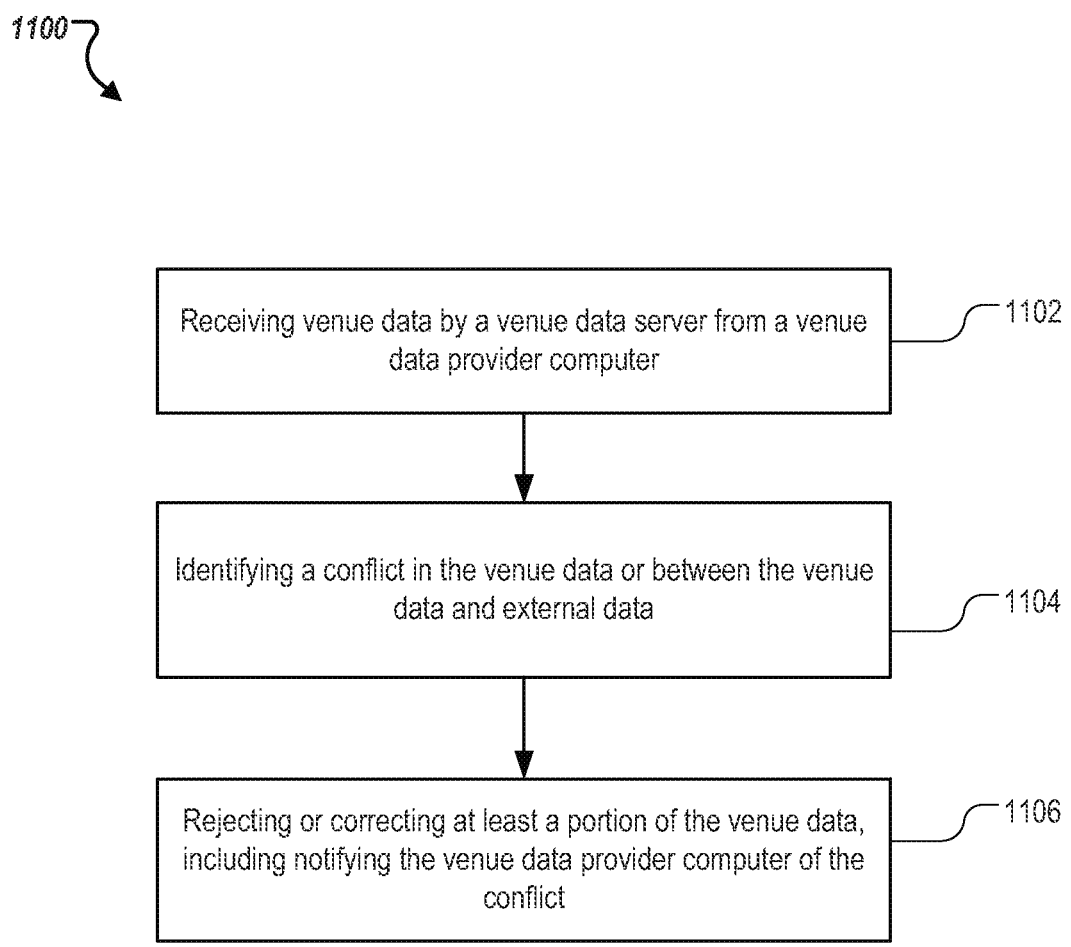
FIG. 11A is a flowchart of an exemplary process of venue data validation.

FIG. 11A is a flowchart of an exemplary process 1100 of venue data validation. Process 1100 can be performed by a system including one or more computer processors, e.g., venue data server 212 of FIG. 2. Process 1100 can be part of stage 1004 of FIG. 10.

The system can receive (1102) venue data from a venue data provider computer. The venue data can include records of physical features of a venue and records of conceptual features. The records of physical features can include representations of geometry and attributes of a physical structure at the venue. The records of conceptual features can include representations of entities that each occupy a portion of, or are associated with, one or more physical structures or features within the venue.

The system can identify (1104) a conflict in the venue data or a conflict between the venue data and external data. The conflict can include a conflict between a physical feature and map data pre-stored on a storage device, a conflict between a physical feature and conceptual feature, a conflict between two temporally sequential states of a single physical or conceptual feature, and a conflict between physical or conceptual feature content when analyzed in context with other data sources within the scope of data integration subsystem 304. The conflict can be defined in a set of conflict rules, including both manually curated and programmatically harvested entries.

For example, identifying a conflict can include identifying the conflict in the records of two or more physical features. The conflict can include an inconsistency between two temporally sequential states of the same physical feature or group of features. The inconsistency can be defined in terms of a physical conflict rule within the rule set. The inconsistency can include an indication that a first physical feature of one type naturally conflicts with an associated or adjoining second physical feature, e.g., a stairwell with an intersecting wall within a single delivery, or an anomalous change in one or more features from one delivery to the next, e.g., significant changes to the geometry of pre-existing floors, buildings or rooms.

For example, identifying a conflict can include identifying the conflict between a physical feature defined within venue data and the map data provided by the base map data integration engine 802. The conflict can include an inconsistency that is defined in terms of a physical conflict rule within the rule set. The inconsistency can include an indication that, according to a polygon representing the physical structure of a feature associated with the venue, the feature has a footprint that exceeds a boundary of the building it is associated with or other physical features associated with the relevant area as captured in the base map data.

Identifying a conflict can include identifying inconsistencies between the features provided within venue data and aggregated data from multiple sources within data integration subsystem 304. For example, data from probe data integration engine 804 and survey data integration engine 806 can be analyzed against delivered venue data to identify commonly used entry points within a venue that are not marked as such, or areas of a venue that were previously surveyed but no longer have the same physical structure or pedestrian traffic.

For example, identifying a conflict can include identifying the conflict between a record defining a physical feature and another record defining a conceptual feature. The conflict can include an inconsistency that is defined in terms of a feature relationship conflict rule within the rule set. The consistency rule can include an indication that one or more attribute designations of the physical feature preclude the conceptual feature from occupying a portion of the physical structure or being associated with it in a particular manner, e.g., based on a real-world or conceptual conflict of attribute designation on either entity.

For example, identifying a conflict can include identifying the conflict between one conceptual feature and another conceptual feature. The conflict can include an inconsistency that is defined, in an entity conflict rule within the rule set. The consistency rule can include an indication that the category of a first entity, e.g., a category identifier identifying an airport baggage claim area, is incompatible with a category of the second entity, e.g., a category identifier identifying a high school. The system can determine the inconsistency upon determining that a category designation of the first entity as represented in the first record precludes the second entity as represented in the second record from occupying the same venue together with the first entity according to a category designation of the second entity as stored in the second record.

The system can determine the set of conflict rules based on historical venue data and ground-truth data. Determining the set of conflict rules can include determining a positive rule allowing association of a first category designation and a second category designation upon determining that at least a portion of records in the historical venue data indicate that an entity having a first category designation occupies a venue having a second category designation, as well as incorporating confirmation within ground-truth data sets. Determining the set of conflict rules can include determining a negative rule designating an inconsistency between a third category designation and a fourth category designation upon determining that all records in the historical venue data indicating that an entity having a third category designation occupies a venue having a fourth category designation are disproved by the ground-truth data. The ground-truth data can include anonymized probe data submitted by one or more user devices. The probe data includes a location of a mobile device that is in the venue having the second category designation and a record of an application launch by the mobile device at the location. The application can be associated with the entity having the first category designation in an entity data store.

The system can reject (1106) at least a portion of the venue data, including notifying the venue data provider computer of the conflict. After rejecting the venue data, the system can continue to receive updated content for the same venue. The system can determine, based on the conflict rules, that the conflict has been removed in the updated venue data. The system can then provide the updated venue data to a survey engine, e.g., a survey application program, for conducting a wireless survey of the venue by one or more sampling devices or to a map engine for generating an indoor map of the venue.

Figure 11B:
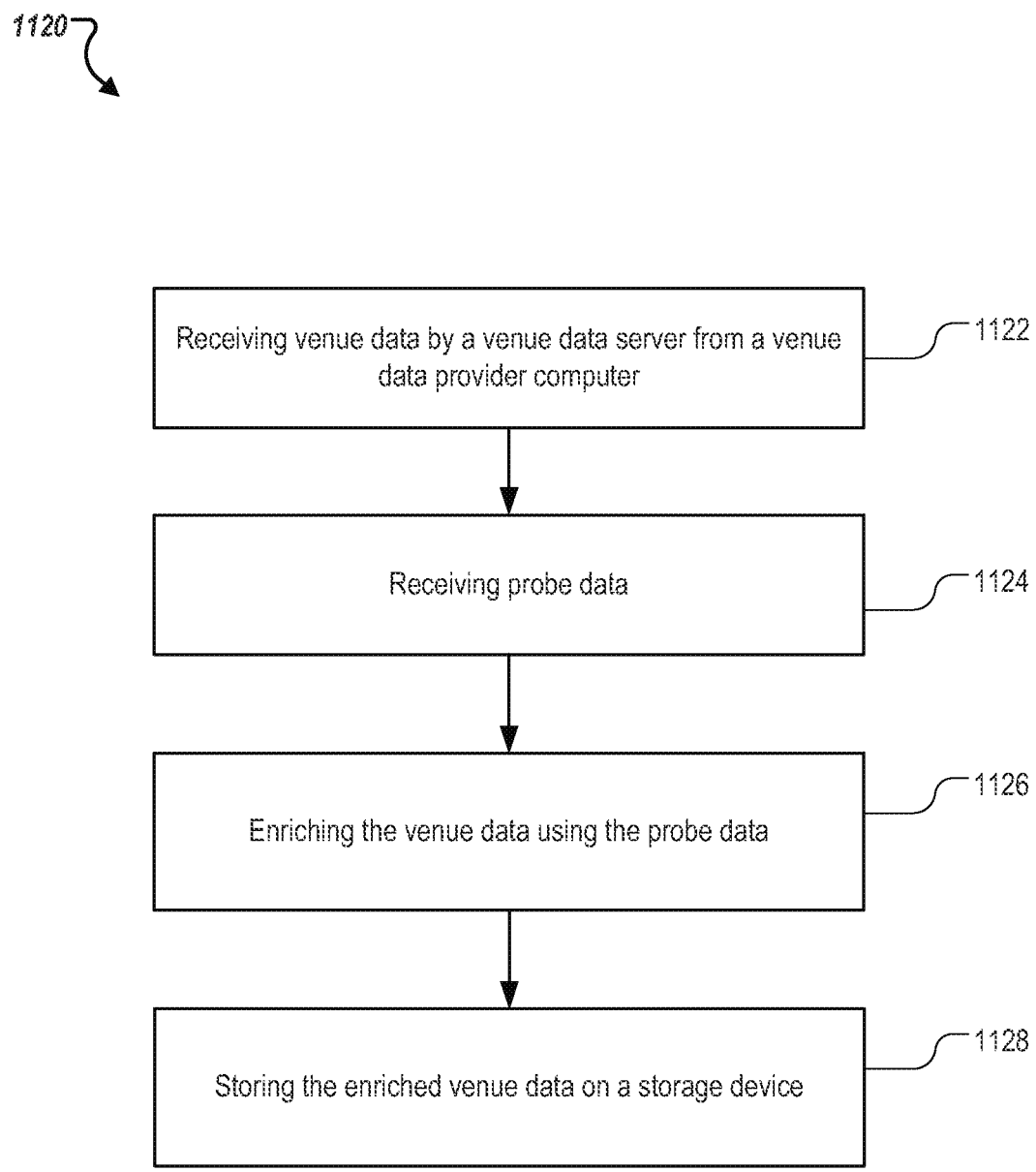
FIG. 11B is a flowchart of an exemplary process of venue data enrichment.

FIG. 11B is a flowchart of an exemplary process 1120 of venue data enrichment. Process 1120 can be performed by a system including one or more processors, e.g., venue data server 212 including data enrichment subsystem 308 of FIG. 3.

The system can receive (1122) venue data from a venue data provider computer. The venue data can include a physical feature and a conceptual feature. The physical feature can include a first data object describing a physical structure, e.g., a floor, at a venue. The conceptual feature can include a second data object describing an entity, e.g., a shop, that occupies or is associated with a portion of the venue. The second data object of the conceptual feature can be nested in the first data object of the physical feature by storing a reference to the first data object in a data field of the second data object.

The system can receive (1124) probe data. The probe data can include at least one of survey data, application launch data, map data, or motion data. The probe data can indicate user activities in the venue and user movements in the venue. The probe data can include crowd-sourced data received from multiple user devices. The application launch data can include records of launches of application programs on the user devices. The application programs can be associated with a name, description, or product name of the entity.

The system can enrich (1126) the venue data using the probe data, including revising inconsistencies in the venue data and adding information to the venue data. The system can enrich the venue data by matching the user activities with an attribute of the entity and matching the user movements with the physical structure.

Adding information to the venue data can include determining a feature categorization, based on the application launch data. The application launch data can indicate that users launch application programs related to the entity in the physical structure. The application programs being associated with the feature categorization in a data store. For example, the application program can be a coupon application that displays a store name, e.g., XYZ Hardware. The system can determine the feature categorization of the entity "XYZ Hardware" using a category code for "XYZ Hardware" as stored in a data store.

Adding information to the venue data can include determining, from the probe data, that pedestrian traffic or site survey is detected for a section of the physical structure that is not represented in the venue data. The system can then identify an inconsistency for investigation or add a record of the section of the physical structure to the venue data in response to the determining.

Adding information to the venue data can include determining one or more transition points using the probe data upon determining that mobile devices moved into or out of the venue at the transition points. The transition points can include venue entry points or venue exit points. The system can add a record of each transition point to the venue data. The system can then provide the added record to an upstream base map data service.

Adding information to the venue data can include determining a connection point between an indoor space of the venue and a road network as recorded in base map data. The system can then add a record of the connection point to the venue data.

Adding information to the venue data can include determining, from the probe data, that mobile devices switch on satellite navigation subsystems of the mobile devices at a portion of the physical structure of the venue. In response, the system can determine that the portion of the physical structure is exposed space, e.g., a balcony. The system can identify an inconsistency for investigation or add a record of the exposed space to the venue data.

Adding information to the venue data can include determining a mode of transportation in the physical structure and a physical feature type of the physical structure using velocity and altitude information in the probe data. The physical feature type can include at least one of an escalator, an elevator bank, or a stairwell. The system can add a record of the physical feature type to the venue data for distinguishing from other pedestrian foot traffic areas represented in the venue data.

Revising inconsistencies in the venue data can include determining hours of operation of the entity using the user activities in the venue and user movements in the venue as indicated in the probe data. The system can determine that the hours of operation are inconsistent with hours of operation as recorded in the conceptual feature. The system can revise the hours of operation in the conceptual feature using the determined hours of operation.

The system can store (1128) the enriched venue data on a storage device, e.g., enriched venue data store 846 of FIG. 8B, for providing an indoor location service of the venue to a user device.

In some implementations, the system can obtain a size of the physical feature. The system can validate one or more attributes of the physical feature as stored in the venue data based on the size, including determining whether the one or more attributes and a state of the one or more attributes are permissible for the size according to a feature validation rule. For example, the system can determine whether a large hardware depot has a sufficient number of doors or fire exits. In some implementations, the system can validate an associated feature of the venue or detect a missing or anomalous feature of the venue as stored in the venue data using a size of the physical structure, wherein the validating and detecting are based on indications of an expected quantity or an expected attribute.

In some implementations, the system can determine, using spatial and temporal information stored in the probe data, a time and a time interval for conducting a site survey at the venue. The time being a time of off-peak traffic at the venue as determined using the probe data. The time interval can be an interval between two off-peak traffic days. The system can provide the time and time interval to a sampling device for surveying the venue.

In some implementations, the system can detect, from the probe data, a change in pedestrian traffic patterns, e.g., based on observations of pedestrian traffic through a physical structure designated as a solid wall. In some implementations, the system can detect an alignment of the pedestrian traffic patterns with existing venue feature data. The system can provide a notification to re-survey the venue or to update a geometry of the venue in response to the detecting.

Exemplary System Architecture

Figure 12:
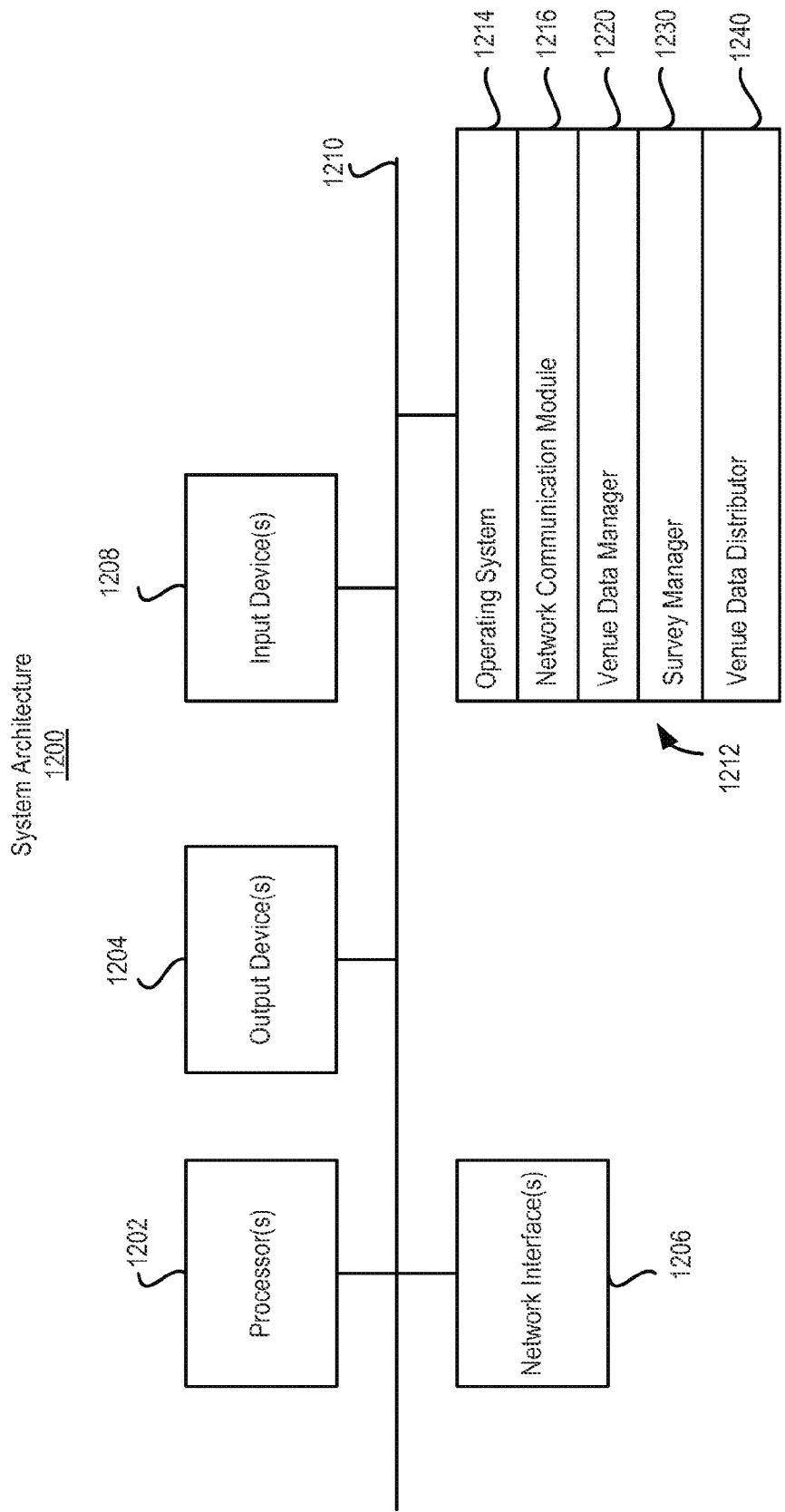
FIG. 12 is a block diagram of an exemplary system architecture for implementing the features and operations of FIGS. 1-11.

FIG. 12 is a block diagram of an exemplary system architecture for implementing the features and operations of FIGS. 1-6. Other architectures are possible, including architectures with more or fewer components. In some implementations, architecture 1200 includes one or more processors 1202 (e.g., dual-core Intel® Xeon® Processors), one or more output devices 1204 (e.g., LCD), one or more network interfaces 1206, one or more input devices 1208 (e.g., mouse, keyboard, touch-sensitive display) and one or more computer-readable mediums 1212 (e.g., RAM, ROM, SDRAM, hard disk, optical disk, flash memory, etc.). These components can exchange communications and data over one or more communication channels 1210 (e.g., buses), which can utilize various hardware and software for facilitating the transfer of data and control signals between components.

The term "computer-readable medium" refers to a medium that participates in providing instructions to processor 1202 for execution, including without limitation, non-volatile media (e.g., optical or magnetic disks), volatile media (e.g., memory) and transmission media. Transmission media includes, without limitation, coaxial cables, copper wire and fiber optics.

Computer-readable medium 1212 can further include operating system 1214 (e.g., a Linux® operating system), network communication module 1216, venue data manager 1220, survey manager 1230, and venue data distributor 1240. Operating system 1214 can be multi-user, multiprocessing, multitasking, multithreading, real time, etc. Operating system 1214 performs basic tasks, including but not limited to: recognizing input from and providing output to devices 1206, 1208; keeping track and managing files and directories on computer-readable mediums 1212 (e.g., memory or a storage device); controlling peripheral devices; and managing traffic on the one or more communication channels 1210. Network communications module 1216 includes various components for establishing and maintaining network connections (e.g., software for implementing communication protocols, such as TCP/IP, HTTP, etc.).

Venue data manager 1220 can include computer instructions that, when executed, cause processor 1202 to perform operations of receiving and storing venue data in one or more files. Survey manager 1230 can include computer instructions that, when executed, cause processor 1202 to provide survey instructions and venue data or maps generated based on the venue data to a sampling device and receive survey data from the sampling device. Venue data distributor 1240 can include computer instructions that, when executed, cause processor 1202 to respond to a request from a user device, including sending venue data or maps generated based on the venue data to the requesting mobile device.

Architecture 1200 can be implemented in a parallel processing or peer-to-peer infrastructure or on a single device with one or more processors. Software can include multiple software components or can be a single body of code.

The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language (e.g., Objective-C, Java), including compiled or interpreted languages, and it can be deployed in any form, including as a stand-alone program or as a module, component, subroutine, a browser-based web application, or other unit suitable for use in a computing environment.

Suitable processors for the execution of a program of instructions include, by way of example, both general and special purpose microprocessors, and the sole processor or one of multiple processors or cores, of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display monitor or a retina display device for displaying information to the user. The computer can have a touch surface input device (e.g., a touch screen) or a keyboard and a pointing device such as a mouse or a trackball by which the user can provide input to the computer. The computer can have a voice input device for receiving voice commands from the user.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction can be received from the client device at the server.

A system of one or more computers can be configured to perform particular actions by virtue of having software, firmware, hardware, or a combination of them installed on the system that in operation causes or cause the system to perform the actions. One or more computer programs can be configured to perform particular actions by virtue of including instructions that, when executed by data processing apparatus, cause the apparatus to perform the actions.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method, comprising:
    receiving, by a venue data server, venue data representing a layout of a venue;
    validating, by the venue data server, the venue data;
    sending, by the venue data server, the validated venue data to a sampling device;
    requesting, by the venue data server, survey data comprising measurements of wireless signals in the venue;
    receiving, by the venue data server, the survey data from the sampling device;
    integrating the venue data and the survey data to determine location fingerprint data of the venue, the location fingerprint data including expected measurements of the wireless signals at respective locations in the venue; and
    providing, by the venue data server, the location fingerprint data to a device through at least one of a map service or an indoor location service.

2. The method of claim 1, wherein the venue data is received through a web upload according to a venue data upload application programming interface (API) using real time submission from a venue data provider computer or using a batch data pull by the venue data server from a venue data provider computer.

3. The method of claim 1, wherein validating the venue data comprises performing at least one of building footprint validation, flyover validation, or three-dimensional visualization validation.

4. The method of claim 1, comprising:
    generating a venue map by the venue data server, the venue map representing internal features of the venue; and
    providing the venue map to a device operated by a venue data provider for review and edit.

5. The method of claim 1, comprising providing, to the sampling device, a survey application for conducting a survey that generates the survey data, the survey application configured to:
    display a venue map on a display device of the sampling device;
    receive a user input at a starting location on the venue map to start the survey, wherein, when the survey is started, the survey application records sensor readings of one or more environmental variables as detected by a sensor and associates each of the sensor readings with a current location of the sampling device and a timestamp; and submit the recorded sensor readings as the survey data to the venue data server.

6. The method of claim 1, comprising integrating venue data with external data to generate map data that represents internal structure of the venue in a map of geographic features, the external data including:

base map data representing geometry and topology of geographic features;

probe data including anonymized location and heading information submitted by user devices;

flyover data including information on three-dimensional geographic features;

user report data including user provided corrections on the base map data or venue data; and web data on geographic features from publicly available web sites.

7. The method of claim 1, wherein integrating the venue data and the survey data comprises:

identifying states of the venue against which individual surveys were created;

determining which state is compatible with the individual surveys based on respective temporal and respective geographic data associated with a plurality of data sets; and integrating the venue data and the survey data based on compatible versions of the venue data and the survey data, wherein one or more compatible versions of the venue data are applied to support positioning in an indoor environment where satellite positioning signals are unavailable.

8. A system comprising:

one or more processors; and a storage device storing computer instructions operable to cause the one or more processors to perform operations comprising:

receiving, by a venue data server, venue data representing a layout of a venue;

validating, by the venue data server, the venue data;

submitting, by the venue data server, the validated venue data to a sampling device;

requesting, by the venue data server, survey data comprising measurements of wireless signals in the venue;

receiving, by the venue data server, the survey data from the sampling device;

integrating the venue data and the survey data to determine location fingerprint data of the venue, the location fingerprint data including expected measurements of the wireless signals at respective locations in the venue; and providing, by the venue data server, the location fingerprint data to a device through at least one of a map service or an indoor location service.

9. The system of claim 8, wherein the venue data is received through a web upload according to a venue data upload application programming interface (API) using real time submission from a venue data provider computer or using a batch data pull by the venue data server from a venue data provider computer.

10. The system of claim 8, wherein validating the venue data comprises performing at least one of building footprint validation, flyover validation, or three-dimensional visualization validation.

11. The system of claim 8, the operations comprising:

generating a venue map by the venue data server, the venue map representing internal features of the venue; and providing the venue map to a device operated by a venue data provider for review and edit.

12. The system of claim 8, the operations comprising providing, to the sampling device, a survey application for conducting a survey that generates the survey data, the survey application configured to:

display a venue map on a display device of the sampling device;

receive a user input at a starting location on the venue map to start the survey, wherein, when the survey is started, the survey application records sensor readings of one or more environmental variables as detected by a sensor and associates each of the sensor readings with a current location of the sampling device and a timestamp; and submit the recorded sensor readings as the survey data to the venue data server.

13. The system of claim 8, the operations comprising integrating venue data with external data to generate map data that represents internal structure of the venue in a map of geographic features, the external data including:

base map data representing geometry and topology of geographic features;

probe data including anonymized location and heading information submitted by user devices;

flyover data including information on three-dimensional geographic features;

user report data including user provided corrections on the base map data or venue data; and web data on geographic features from publicly available web sites.

14. The system of claim 8, wherein integrating the venue data and the survey data comprises:

identifying states of the venue against which individual surveys were created;

determining which state is compatible with the individual surveys based on respective temporal and respective geographic data associated with a plurality of data sets; and integrating the venue data and the survey data based on compatible versions of the venue data and the survey data, wherein one or more compatible versions of the venue data are applied to support positioning in an indoor environment where satellite positioning signals are unavailable.

15. A non-transitory storage device storing computer instructions operable to cause one or more processors to perform operations comprising:

receiving, by a venue data server, venue data including a representation of a layout of a venue;

validating, by the venue data server, the venue data;

submitting, by the venue data server, the validated venue data to a sampling device;

requesting, by the venue data server, survey data comprising measurements of wireless signals in the venue;

receiving, by the venue data server, the survey data from the sampling device;

integrating the venue data and the survey data to determine location fingerprint data of the venue, the location fingerprint data including expected measurements of the one or more wireless signals at respective locations in the venue; and providing, by the venue data server, the location fingerprint data to a device through at least one of a map service or an indoor location service.

16. The non-transitory storage device of claim 15, wherein the venue data is received through a web upload according to a venue data upload application programming interface (API) using real time submission from a venue data provider computer or using a batch data pull by the venue data server from a venue data provider computer.

17. The non-transitory storage device of claim 15, wherein validating the venue data comprises performing at least one of building footprint validation, flyover validation, or three-dimensional visualization validation.

18. The non-transitory storage device of claim 15, the operations comprising:
   generating a venue map by the venue data server, the venue map representing internal features of the venue; and
   providing the venue map to a device operated by a venue data provider for review and edit.

19. The non-transitory storage device of claim 15, the operations comprising providing, to the sampling device, a survey application for conducting a survey that generates the survey data, the survey application configured to:
   display a venue map on a display device of the sampling device;
   receive a user input at a starting location on the venue map to start the survey, wherein, when the survey is started, the survey application records sensor readings of one or more environmental variables as detected by a sensor and associates each of the sensor readings with a current location of the sampling device and a timestamp; and
   submit the recorded sensor readings as the survey data to the venue data server.

20. The non-transitory storage device of claim 15, the operations comprising integrating venue data with external data to generate map data that represents internal structure of the venue in a map of geographic features, the external data including:
   base map data representing geometry and topology of geographic features;
   probe data including anonymized location and heading information submitted by user devices;
   flyover data including information on three-dimensional geographic features;
   user report data including user provided corrections on the base map data or venue data; and
   web data on geographic features from publicly available web sites.

21. The non-transitory storage device of claim 15, wherein integrating the venue data and the survey data comprises:
   identifying states of the venue against which individual surveys were created;
   determining which state is compatible with the individual surveys based on respective temporal and respective geographic data associated with a plurality of data sets; and
   integrating the venue data and the survey data based on compatible versions of the venue data and the survey data, wherein one or more compatible versions of the venue data are applied to support positioning in an indoor environment where satellite positioning signals are unavailable.

* * * * *